(12) United States Patent  (10) Patent No.: US 9,715,391 B2
O'Sullivan  (45) Date of Patent: Jul. 25, 2017

(54) CACHE MEMORY APPARATUS

(71) Applicant: MMAGIX TECHNOLOGY LIMITED, Douglas, Isle of Man (GB)

(72) Inventor: Daniel Shane O'Sullivan, Morley (AU)

(73) Assignee: MMAGIX TECHNOLOGY LIMITED, Isle of Man (GB)

( * ) Notice: Subject to any disclaimer, the term of this patent is extended or adjusted under 35 U.S.C. 154(b) by 0 days.

(21) Appl. No.: 15/054,644

(22) Filed: Feb. 26, 2016

(65) Prior Publication Data

US 2016/0210155 A1 Jul. 21, 2016

Related U.S. Application Data

(63) Continuation of application No. 13/950,565, filed on Jul. 25, 2013, now Pat. No. 9,274,969, which is a continuation of application No. 13/112,454, filed on May 20, 2011, now Pat. No. 8,504,808, which is a continuation of application No. 10/523,031, filed as application No. PCT/AU03/00994 on Aug. 6, 2003, now Pat. No. 7,971,030.

(60) Provisional application No. 60/401,886, filed on Aug. 7, 2002, provisional application No. 60/402,024, filed on Aug. 7, 2002, provisional application No. 60/402,013, filed on Aug. 7, 2002, provisional application No. 60/420,181, filed on Oct. 22, 2002, provisional application No. 60/420,486, filed on Oct. 22, 2002.

(51) Int. Cl.
*G06F 9/30* (2006.01)
*G06F 9/38* (2006.01)
*G06F 9/52* (2006.01)
*G06F 12/0875* (2016.01)

(52) U.S. Cl.
CPC .......... *G06F 9/3867* (2013.01); *G06F 9/3001* (2013.01); *G06F 9/3004* (2013.01); *G06F 9/3012* (2013.01); *G06F 9/3013* (2013.01); *G06F 9/30036* (2013.01); *G06F 9/30083* (2013.01); *G06F 9/30087* (2013.01); *G06F 9/30101* (2013.01); *G06F 9/30134* (2013.01); *G06F 9/30149* (2013.01); *G06F 9/30167* (2013.01); *G06F 9/30181* (2013.01); *G06F 9/30185* (2013.01); *G06F 9/30189* (2013.01); *G06F 9/3879* (2013.01); *G06F 9/3885* (2013.01); *G06F 9/526* (2013.01); *G06F 12/0875* (2013.01); *G06F 2212/452* (2013.01)

(58) Field of Classification Search
None
See application file for complete search history.

*Primary Examiner* — Corey S Faherty
(74) *Attorney, Agent, or Firm* — Locke Lord LLP

(57) ABSTRACT

A cache memory apparatus includes an L1 cache memory, an L2 cache memory coupled to the L1 cache memory, an arithmetic logic unit (ALU) within the L2 cache memory, the combined ALU and L2 cache memory being configured to perform therewithin at least one of: an arithmetic operation, a logical bit mask operation; the cache memory apparatus being further configured to interact with at least one processor such that atomic memory operations bypass the L1 cache memory and go directly to the L2 cache memory.

16 Claims, 29 Drawing Sheets

| Cycle Flags | Operations requesting number of cycles |
|---|---|
| 0 (2101) | Normal (simple cycle) (2109) |
| 1 (2103) | Double (two cycles/single/double processes load/save) (2111) |
| 2 (2105) | Extend (multi cycles/double processes load/save) (2113) |
| 3 (2107) | Repeated (multiple cycles/single/double process status) (2115) |

FIG. 21

| Type Flag | Number of Registers | Number of Bits | Type |
|---|---|---|---|
| 0 (2201) | 4 (2205) | 32 (2209) | Data (2213) |
| 1 (2203) | 8 (2207) | 32 (2211) | Address (2215) |

FIG. 22

CACHE MEMORY APPARATUS

CROSS REFERENCE TO RELATED APPLICATIONS

The present application is a continuation of U.S. patent application Ser. No. 13/950,565, filed Jul. 25, 2013, now U.S. Pat. No. 9,274,969, which is a continuation of U.S. patent application Ser. No. 13/112,454, filed May 20, 2011, now U.S. Pat. No. 8,504,808, which is a continuation of U.S. patent application Ser. No. 10/523,031, filed Feb. 2, 2005, now U.S. Pat. No. 7,971,030, which is a §371 national stage of International Application Serial No. PCT/AU03/00994, filed Aug. 6, 2003, which claims priority from U.S. Provisional Patent Application Ser. No. 60/401,886, filed Aug. 7, 2002, U.S. Provisional Application Ser. No. 60/402,013, filed Aug. 7, 2002, U.S. Provisional Application Ser. No. 60/402,024, filed Aug. 7, 2002, U.S. Provisional Application Ser. No. 60/420,486, filed Oct. 22, 2002, and U.S. Provisional Application Ser. No. 60/420,181, filed Oct. 22, 2002, all of which are incorporated herein by reference in their entirety.

FIELD

This application relates to computing hardware and, more particularly to cache memory.

BACKGROUND

Typically, users, which may be people or other systems, engage information technology systems (e.g., commonly computers) to facilitate information processing. In turn, computers employ processors to process information and such processors are often referred to as central processing units (CPUs). A common form of processor is referred to as a microprocessor. A computer operating system, which is software that is executed on a computer, enables and facilitates users to access and operate computer information technology and resources. Common resources employed in information technology systems include input and output mechanisms through which data may pass, memory storage into which data may be saved, and processors by which information may be processed. Often information technology systems are used to collect data for later retrieval, analysis, and manipulation, which often is facilitated through database software. Information technology systems provide interfaces that allow users to access and operate various system components.

Early single chip microprocessors included the Intel 8080 (an 8-bit processor introduced in 1974), the Motorola 6502 (an 8-bit processor introduced in 1977), the Intel 8088 (introduced in 1979 and incorporated into the IBM Personal Computer (PC)). The vast majority of the PC market moved from the Intel 8088 to the 80286 to the 80386 to the 80486 to the Pentium to the Pentium II to the Pentium III to the Pentium 4. While the current microprocessor market is dominated by the Intel architecture, other processors such as the Motorola 68000 and PowerPC have minor market shares.

The various processors employ disparate architectures including a complex instruction set computer (CISC) and a reduced instruction set computer (RISC). Microprocessors provide instruction sets that allow program developers to exploit and use the microprocessors to execute and process information. Typically, program developers use program languages that are compiled into a microprocessor's instruction set by a special program called a compiler. Compilers themselves are made by program developers who use tools to design compilers to produce instructions for a specific microprocessor.

These designs of the microprocessor originated several years ago, and have evolved over time. As the designs have evolved, the clock rate of the microprocessor has been increased to deal with more instructions within a fixed time frame.

SUMMARY OF THE INVENTION

In accordance with non-limiting, present, inventive aspects of the disclosure, problems of increased power requirements, heat generation, design complexity and resulting reduced processing efficiency in processors are overcome.

The increased clock rate of microprocessor architectures in the prior art causes many serious problems such as deepened pipelines, increased power requirements, which result in elevated heat in the chip, all of which making the already complex circuitry even more complicated. Further, as the designs have evolved, it has been necessary to maintain compatibility with earlier products. This results in a large number of hardware features being incorporated that are not used in new application software because the new software tends to comply with existing hardware features. This represents a waste of hardware capacity that could be better employed.

The above-identified problems are solved and a technical advance is achieved in the art of a processor with a synchronicity independent, power and instruction optimizing, and resource delegating processor of the present invention. An exemplary processor of the present invention includes: an integer processing unit adapted to execute instructions of a program; a mathematical processing unit adapted to receive a request from the integer processing unit; and a router that interfaces between the integer processing unit and the mathematical processing unit, wherein the router is adapted to route a request from the integer processing unit to the mathematical processing unit.

In accordance with another, non-limiting, present, inventive aspect of the disclosure, there is provided an architecture of a processor for executing instructions of a program. An exemplary processor of the present invention includes: a plurality of processing units each capable of executing instructions of a program independently, and a cache unit configured to receive access requests from the plurality of processing units and returns results to the plurality of processing units in response to the access requests, wherein each of the plurality of processing units is configured to sleep after sending an access request to the cache unit.

In accordance with another, non-limiting, present, inventive aspect of the disclosure, there is provided an architecture of a processor for executing instructions of a program. An exemplary processor of the present invention includes: a processing unit with an internal cache unit, residing internal to the processing unit, configured to execute instructions of a program; and an external cache unit, residing external to the processing unit, configured to cooperate with the internal cache unit of the processing unit, wherein each of the internal and external cache units is divided into an instruction area and a data area, and the data area is further subdivided into a local area and a global area thereby increasing the cache hit rate.

In accordance with another, non-limiting, present, inventive aspect of the disclosure, there is provided a cache memory apparatus. The cache memory apparatus includes an L I cache memory, an L2 cache memory coupled to the L I cache memory, an arithmetic logic unit (ALU) within the L2 cache memory, the combined ALU and L2 cache memory being configured to perform therewithin at least one of an arithmetic operation, a logical bit mask operation, the cache memory apparatus being further configured to interact with at least one processor such that atomic memory operations bypass the L I cache memory and go directly to the L2 cache memory.

The above advantages and features are of representative embodiments only, and are not exhaustive and/or exclusive. They are presented only to assist in understanding the invention. It should be understood that they are not representative of all the inventions defined by the claims, to be considered limitations on the invention as defined by the claims, or limitations on equivalents to the claims. For instance, some of these advantages may be mutually contradictory, in that they cannot be simultaneously present in a single embodiment. Similarly, some advantages are applicable to one aspect of the invention, and inapplicable to others. Furthermore, certain aspects of the claimed invention have not been discussed herein. However, no inference should be drawn regarding those discussed herein relative to those not discussed herein other than for purposes of space and reducing repetition. Thus, this summary of features and advantages should not be considered dispositive in determining equivalence. Additional features and advantages of the invention will become apparent in the following description, from the drawings, and from the claims.

BRIEF DESCRIPTION OF THE DRAWINGS

The accompanying drawings illustrate various non-limiting, example, inventive aspects of the present disclosure:

FIG. 21 is of a table illustrating one, non-limiting example, inventive aspect of the present disclosure of multicycle instruction reduction;

FIG. 22 is of a table illustrating one, non-limiting example, inventive aspect of the present disclosure which provides various integer processing unit registers, which may be accessed based on type flags that are set in a reduced register address portion of an instruction;

DETAILED DESCRIPTION

In the following description of the various embodiments, reference is made to the accompanying drawings which form a part hereof, and in which is shown by way of illustration various embodiments in which the invention may be practiced. It is to be understood that other embodiments may be utilized and structural and functional modifications may be made without departing from the scope of the present invention.

Data processing System Overview

Figure 1A:
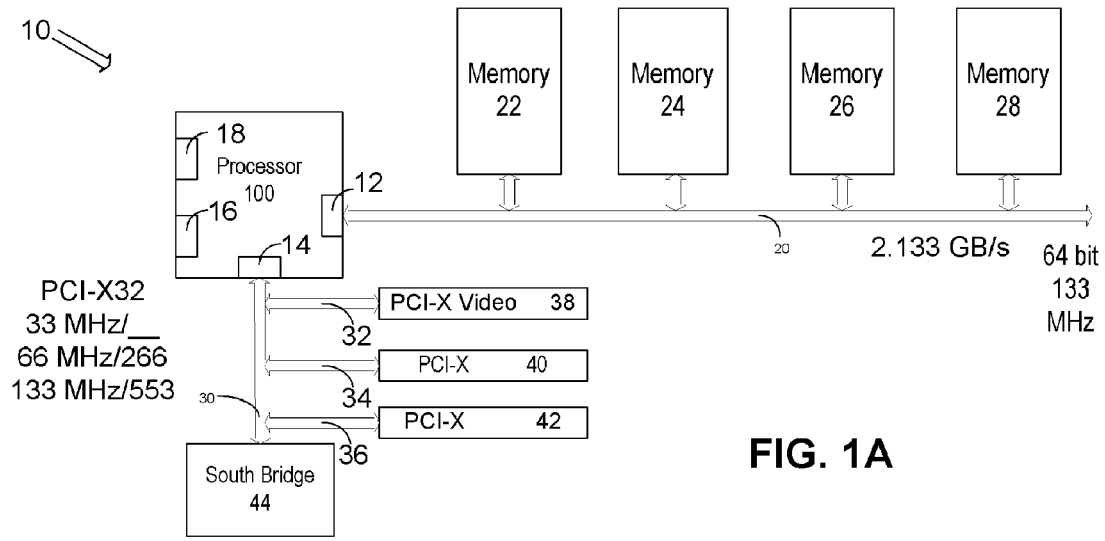
FIGS. 1A, 1B, 1C are of diagrams illustrating non-limiting example, present, inventive aspects of the disclosure providing overviews of a data processing system.
Figure 1B:
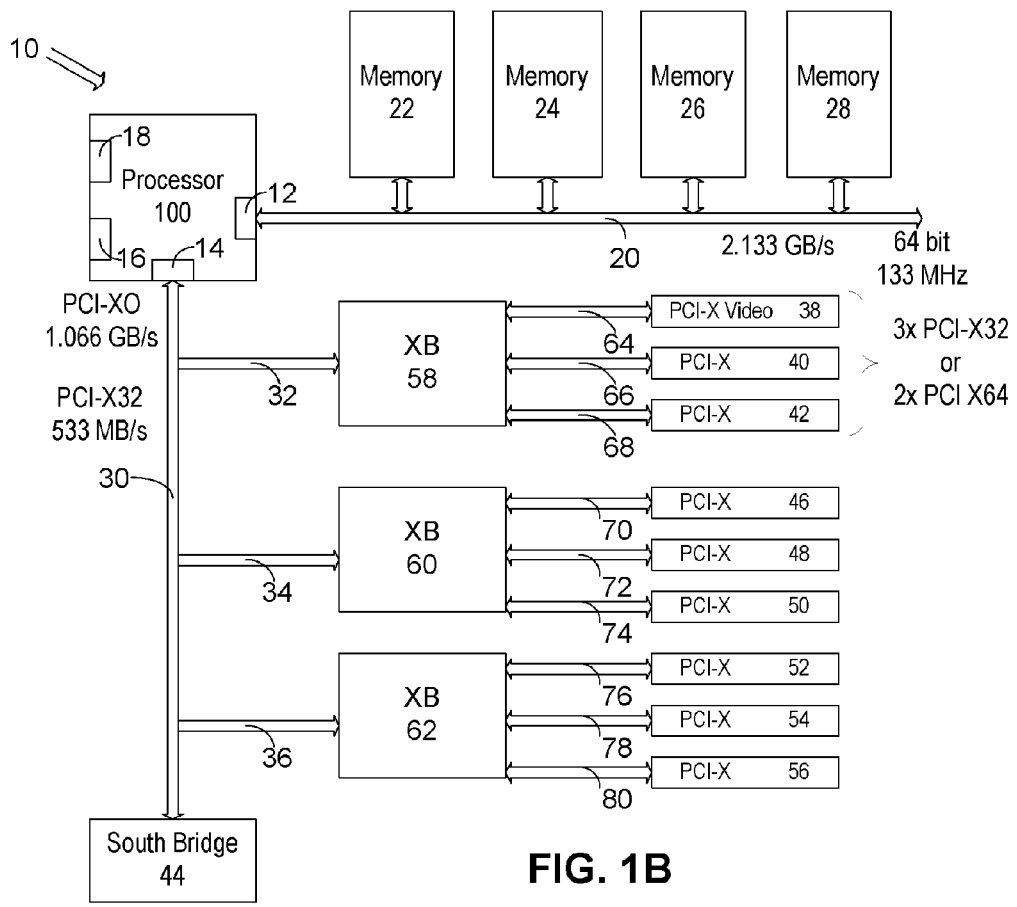
Figure 1C:
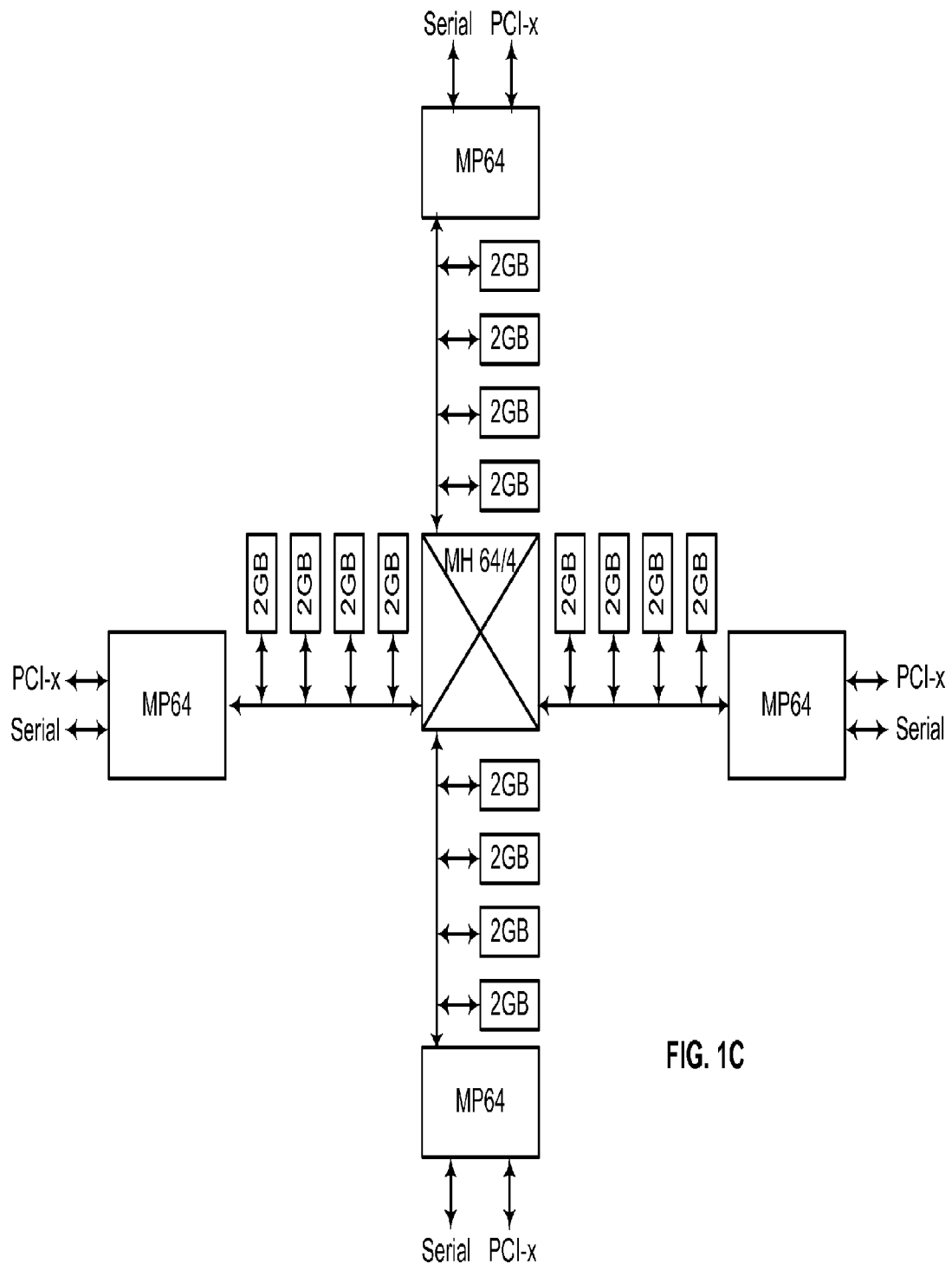

FIGS. 1A, 1B, 1C are of diagrams illustrating non-limiting example, present, inventive aspects of the disclosure providing overviews of a data processing system 10 in which a Processor 100 of the present invention is connected to external devices. It should be noted that these overviews are reference systems and that Processor 100 may be deployed in numerous contexts such as, but not limited to, communications systems, desktop systems, embedded systems, extra-terrestrial systems, server systems, and/or the like. Briefly, Processor 100 may be configured to connect directly to at least one of external memories 22, 24, 26, 28, a bus 20, and an input/output (I/O) bus 30 to result in a data processing system. The I/O bus may employ any number of bus architectures such as, but not limited to accelerated graphics port (AGP), card bus, (extended) industry standard architecture (EISA), micro channel architecture (MCA), NuBus, peripheral component interconnect (extended) (PCI-X), personal computer memory card international association (PCMCIA), and/or the like.

Figure 7:
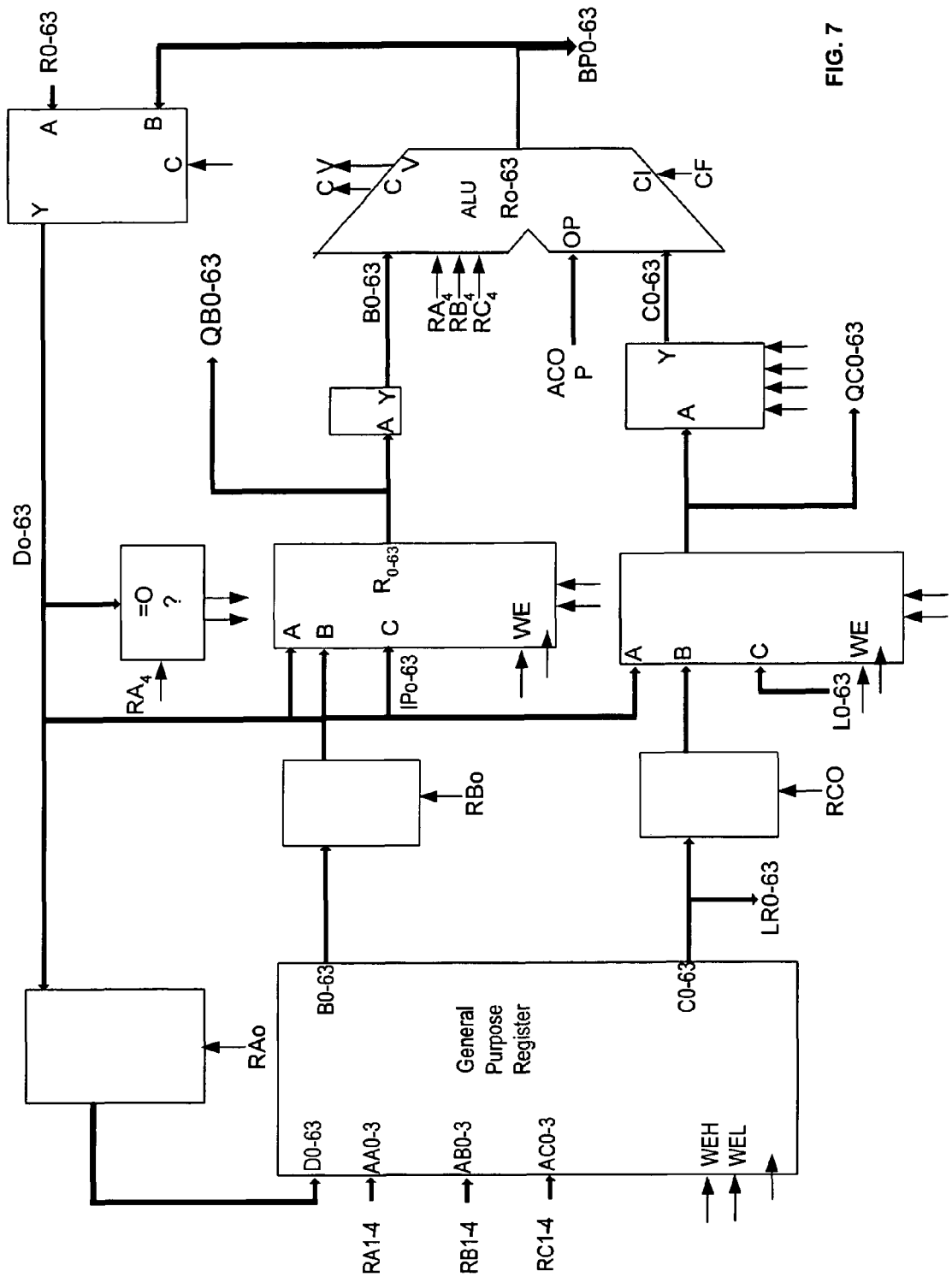
FIG. 7 is of a simplified schematic diagram illustrating an alternative, non-limiting example, inventive aspect of the present disclosure of the data path of an integer processing unit of a processor.

In one non-limiting example embodiment 2 of FIG. 1A, a synchronicity independent, resource delegating, power and instruction optimizing Processor 100 of the present invention is provided with an external memory interface 12 which may be configured to be connected to up to 4 GB (.about.$2^{32}$ bits) of memory built with various memory technologies and/or capacities 22, 24, 26, 28. In alternative embodiments, Processor 100 may employ greater than 32-bits for addressing and/or processing information, and as such may address more memory (e.g., 48-bits, 64-bits, 128-bits, etc.). FIG. 7, for example, illustrates a non-limiting 64-bit example embodiment of Processor 100 addressing. The external memory interface may support system bus 20 with 72-bit parallel transfers, providing 64-bit words with error control. Each of the memories may be segmented into smaller, say 64 KB segments and larger, say 1 MB segments closely matching the memory allocation and management methods of multi-user operating systems such as Unix. Each of the memory segments may be locked to a thread ID or with a shared group lock for an improved utilization efficiency of the memories. Instead of using the virtual memory mapping as in conventional processor technologies, which takes extra time for accesses, Processor 100 of the present invention uses real memory as required by applications. Using the real memory improves the quality of multimedia data access and presentation, which require real-time processing. Alternatively, virtual memory mapping may be used depending on the application of Processor 100 of the present invention.

In another non-limiting example embodiment 4 of FIG. 1B, Processor 100 may be provided with a PCI-X interface 14 which may be configured to be connected to PCI standard hardware devices 38, 40, 42, as an embodiment. Currently, the PCI-X interface provides a 32 or 64-bit wide transaction oriented bus, at up to 133 MHz. However, faster implementations may be contemplated. Many I/O controller cards and chips are currently available for this wide transaction oriented bus. Cross bridges (XB) 58, 60, 62 may be used to further utilize the PCI-X interface with more hardware devices. The PCI-X interface supports so-called split transactions, i.e., an action may be initiated on one hardware device and, while it is completing, another transaction may be run on a different hardware device. Commercially available Southbridge chips 44 may be used to interface between the PCI-X interface and the standard hardware devices. Essentially, the PCI-X interface and its controller become invisible to software, which conducts transactions directly with the external device (e.g., Direct Memory Access, DMA).

Processor 100 may also be provided with a synchronous port 16 from which a time division multiplexing (TDM) device may be connected. In one embodiment, a total of 16-pins are provided and configured to support various styles of TDM serial data port. The synchronous port may also be connected to audio codecs (coder/decoder) and transfer continuous streams of data at a strictly defined rate. The synchronous port may also be used for local connections between multiple processors of the present invention.

Processor 100 may be further provided with a standard IEEE test port 18 (e.g., IEEE 1149). In addition to the standard IEEE functions, the port may be configured to support additional commands for loading and examining on-chip registers and memory arrays. The test port may also be used for loading power-up initialization code and program debugging.

FIG. 1C illustrates a clustering of Processor 100 as a multiple processor system 6. The multiple processor system comprises four Processors 100-2, 100-4, 100-6, 100-8 each connected to a Memory Hub (MH) 90 via Memory Buses 20-2, 20-4, 20-6, 20-8. Each of the Processors may have a similar architecture to Processor 100. In an embodiment, each of the Processors may be a video processor with high bandwidth interface. Integrating the video processors with the memory hub may improve the efficiency of the processors benefiting from the direct memory access (DMA).

Each of Memory Buses 20-2, 20-4, 20-6, 20-8 is connected to the memory devices on its own. For example, memories 22-2, 24-2, 26-2, 28-2 are connected to memory bus 20-2 of Processor 100-2. All of the memories is combined into a shared memory space and accessible by all Processors, as required by most multiprocessor operating systems. To this end, the memory buses are enhanced with, for example, a dual-master Bus Request/Grant Mechanism enabling the memory buses to be shared by another chip at the other end of the memory bus from a Processor. Each of the Processors may use the memories on its own bus directly, or may use the memories on another processor's memory bus via the memory hub using the Bus Request/Grant Mechanism to take over the control of the another bus for the duration of a memory burst access. A Processor (e.g., Processor 100-2) attempting an access to a memory (e.g., Memory 22-4) for another bus (e.g., Bus 20-4) is recognized by the memory hub which is configured to request a temporary mastery of the another bus from its Processor (e.g., Processor 100-4). Processor 100-2 then completes the memory transaction. The memory hub may be configured to arbitrate the processor's competing requests.

Each of the Processors may use atomic lock/unlock instructions acting at the L2 cache level to coordinate the sharing of a global memory area in a way that removes the need to maintain the L1/L2 cache coherency. All of the atomic memory instructions have a feature in common that the variable operated on is in the L2 cache, and is never copied into the L1 cache. With the L1 cache global flushing on unlock and semaphore signal, the L1/L2 cache coherency does not have to be maintained. In a multichip clustered system, only interchip L2 cache coherency need to be maintained, and even then only for the atomic instructions. This has a much lower overhead than a full intercache coherency mechanism. When any Processor executes an atomic memory instruction, this is recognized by the Memory Hub. The memory hub then requests a temporary control of all Processors' memory busses and broadcasts the atomic memory operation to all the Processors, which must maintain L2 cache coherency in this case only. Thus the overheads of inter-L2 cache coherency in a clustered system are incurred only on the atomic memory operations, which are relatively uncommon, while the overwhelming majority of memory operations incur no overhead when accessing a memory directly, and relatively little overhead when accessing a memory indirectly via the memory hub. The cache coherency issue will be described in later sections in more detail.

Hardware Architecture

Figure 2:
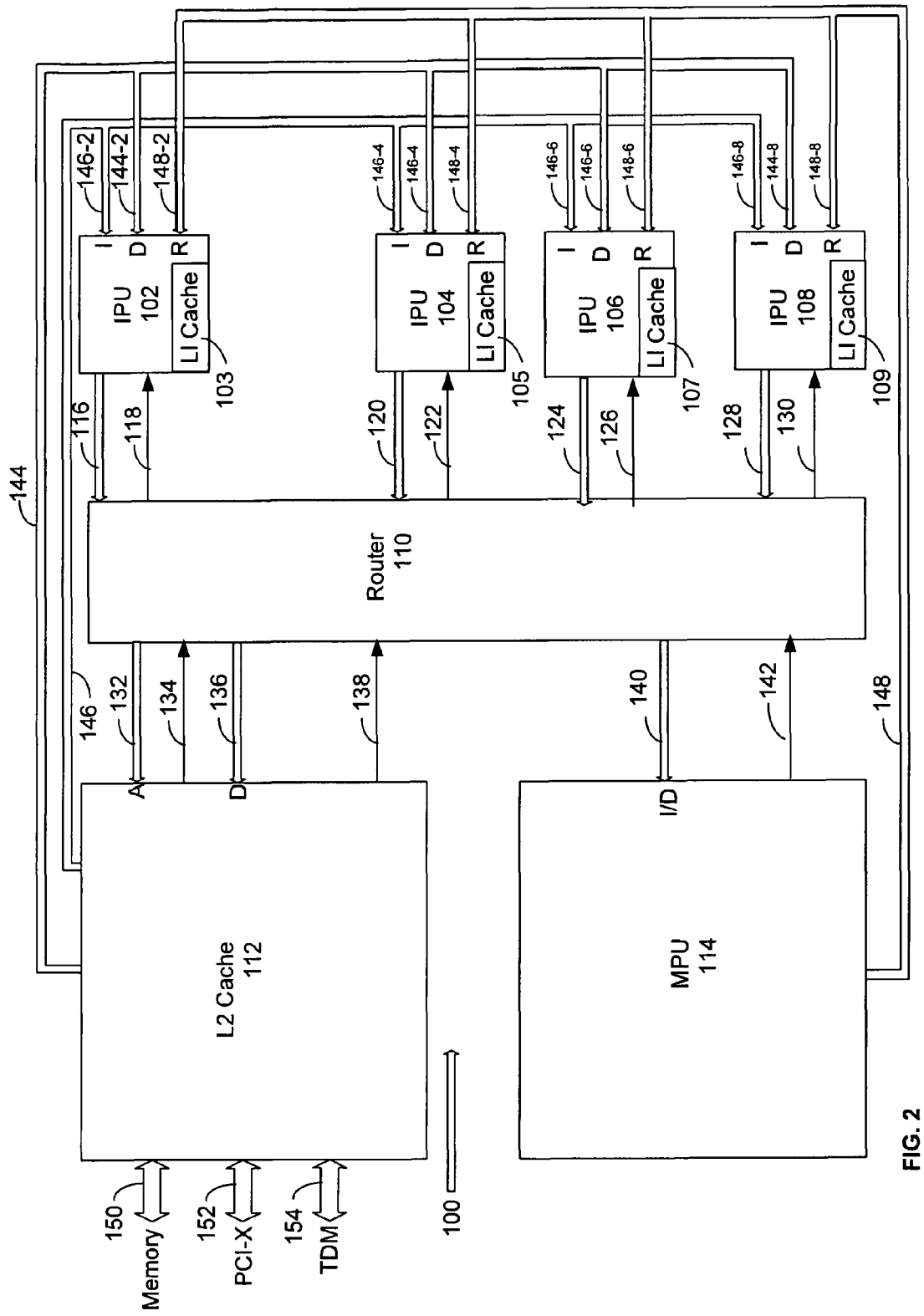
FIG. 2 is of a functional block diagram illustrating one, non-limiting example, inventive aspect of the present disclosure providing an architecture of a processor.

FIG. 2 is of a functional block diagram illustrating one, non-limiting example, inventive aspect of the present disclosure providing an architecture of Processor 100 of the present invention. Processor 100 comprises Integer Processing Units ("IPUs") 102, 104, 106, 108, a Router 110, a secondary (i.e., level two) cache memory ("L2 cache") 112 and a Mathematical Processing Unit ("MPU") 114. The IPUs are disposed in communication with the L2 cache and the MPU via the Router along with System Buses 116, 118, 120, 122, 124, 126, 128, 130, 132, 134, 136, 138, 140, 142, 144, 146, 148. In this exemplary architecture, four IPUs 102, 104, 106, 108 are collaborating with single MPU 112 and L2 cache 114 (i.e., a single MPU 112 and L2 cache 114 are shared by four IPUs 102, 104, 106, 108). Alternatively, the number of IPUs, MPUs and L2 caches may vary in other embodiments depending on the requirement of specific applications.

The configuration of Processor 100 will depend on the context of system deployment. Factors such as, but not limited to, the desired throughput of a processor, capacity and/or location of the underlying system, nature of desired system deployment (e.g., portable, desktop, server, and/or the like environments) may affect deployment requirements and configuration. It should be further noted that disparate processing resources may be employed in various quantities. Processing resources may include digital signal processing units (DSPs), graphic processing units (GPUs), IPUs, input/output controller processing units, memory management units (MMUs), MPUs, processing cache memory, vector processing units (VPUs), and/or the like. For example, in certain embodiments such as 3D animation rendering, floating-point throughput is desirable and Processor 100 may be configured with a single IPU and four MPUs interconnected by a Router. In yet another example embodiment, such as for a high traffic web server, handling multiple web requests simultaneously may require Processor 100 configured with 16 IPUs, a single MPU, and larger processing cache interconnected by a Router. Further, in certain environments, processing resources may employ fewer or greater than 32-bit addressing and instruction pathways. For example, for environments where working with large datasets, 64-bit instruction and addressing may be employed for any of the processing resources.

It should be noted that although processing resources on Processor 100 may be external to each other, the architecture and arrangement of the processing resources makes them intra-chip dependent and interactive. This architecture is significantly different from current and prior art designs. Rather than merely duplicating the functionality of an existing, discrete, monolithic microprocessor design for a system to achieve a multiprocessor system a radical rethinking and implementation is exhibited by Processor 100 of the present invention. In other words, elemental processing resources (e.g., IPUs, MPUs, L2 caches), which individually may not be capable of servicing an entire instruction set, are dependant on one another. These intra-dependent processing resources, together, service an instruction set more efficiently. Further, through instruction set design and intra-chip networking via a Router, these intra-dependent processing resources are capable of identifying other processing resources to which they may delegate instruction signals that they themselves may be incapable of servicing. This intra-dependent, networked, processing resource, design chip architecture is more efficient than current and prior art monolithic designs. For example, prior art systems may combine two Intel Pentium chips in a system for extra integer performance. However, such a system will be inefficient as such monolithic chip duplication will also duplicate extra mathematical processing logic, memory management logic, etc., which may go underutilized. Furthermore, such prior art designs depend on processor intensive and time expensive operating system scheduling to make use of the added processing facilities. Processor 100 of the present invention does not suffer from these limitations. It may employ numerous IPUs to enhance integer processing throughput, and itself may delegate instruction processing to the proper processing resources without duplicating underutilized portions of a chip.

IPUs 102, 104, 106, 108 are the general integer and logic processing units of Processor 100 and each of the IPUs is responsible for running a separate program thread (i.e., a part of a program that can be executed independently of other IPUs). Furthermore, each of the IPUs may run independent processes and program software. In one embodiment, each IPU may be a simple 32 bit microcomputer with 8.times.32 bit data registers (D0-7), 8.times.32 bit address registers (A0-7), a 32-bit instruction pointer (IP) and a 32 bit return link pointer (RP). Address register A7 may be used as a stack pointer. Alternatively, each IPU may be a 32-bit or 64-bit microcomputer. A 32-bit IPU may have a bank of 16 general purpose registers of 32 bits, organized as 8 address registers and 8 data registers. In a 32-bit implementation of Processor 100, 64 bit operations may take an extra cycle (i.e., double precision operations). A 64-bit IPU may have a bank of 16 general purpose registers of 64-bits, organized as 8 address registers and 8 data registers.

Each of IPUs 102, 104, 106, 108 is configured to execute the instructions of a thread and/or process and perform relatively simple calculations of the instructions such as add, subtract, basic logic (e.g., Boolean operations) and/or integer calculations. Each of the IPUs are further configured, upon decoding an instruction while executing the instructions of the thread and/or process, to send calculation requests along with data and opcode of the instruction to MPU 114 for relatively complex calculations such as multiplication, division and/or floating point calculations. Alternatively, the IPUs may be configured to send the instructions themselves that require complex calculations to the MPU without decoding the instructions. Similarly, each of the IPUs may also be configured, while executing the instructions of the thread and/or process, to send access requests to L2 cache 112 for accessing data and/or instructions stored in the L2 cache.

Each of IPUs 102, 104, 106, 108 includes at least one level of internal cache ("L1 cache") such as L1 caches 103, 105, 107, 109 and each of the L1 caches of the IPUs may be subdivided into areas for instruction cache (I-cache) and data cache (D-cache). The D-cache is further subdivided into local and global areas using a hash function to increase the cache hit rates as compared to the uniform cache of a similar size. The hash function is described in more detail in FIG. 5.

Figure 12:
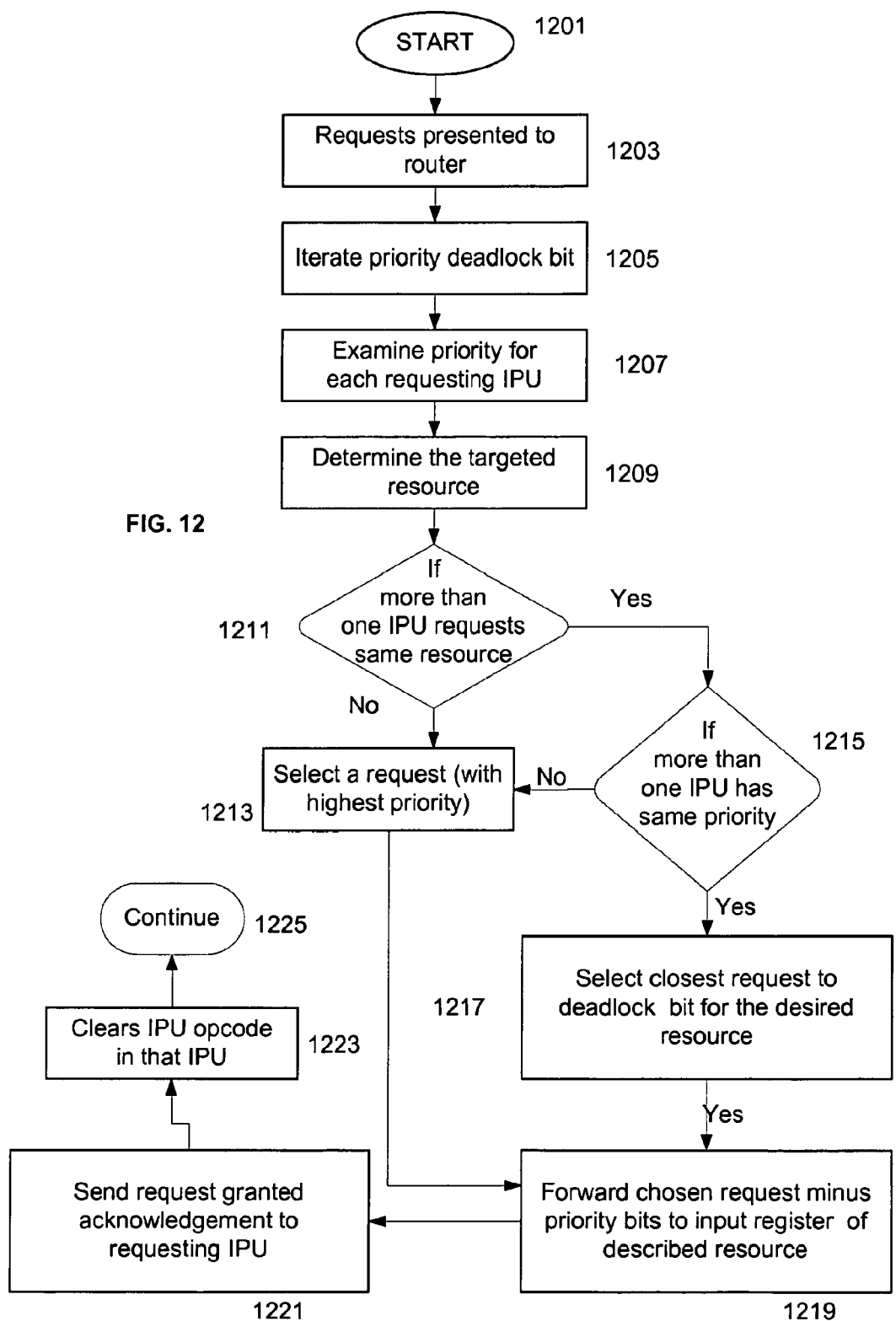
FIG. 12 is of a flow diagram illustrating one, non-limiting example, inventive aspect of the present disclosure of request handling in a router of a processor routing requests between the requesting processing resources and servicing processing resources.

Router 110 is an instruction signal switching hub between the processing resources such as the IPUs, L2 cache and MPU. In one non-limiting example embodiment, the router may employ a cross-point switch. The router receives requests from the IPUs via system buses 116, 120, 124, 128 and routes them to target resources (e.g., L2 cache 112 or MPU 114) via system buses 132, 136, 140. The request competition between the IPUs may be resolved with different level of priorities (e.g., low, medium and high) assigned to the IPUs at a given time adding the flexibility of the access priority. FIG. 12 describes the access priority in more detail. In an alternative embodiment, the router may arbitrate the requests from the IPUs based on a round robin priority method. The router may be configured to send acknowledgements to the IPUs via response paths 118, 122, 126, 130 in response to the requests from the IPUs. The router may also be configured to receive acknowledgements from the L2 cache and MPU via return paths 134, 138, 142.

L2 cache 112 is an external cache to IPUs 102, 104, 106, 108 and shared by the IPUs. The L2 cache receives access requests from the IPUs via router 110 along with instruction bus 132 and data bus 136, respectively. The requested data and instructions are delivered to the requesting IPUs via data bus 144 and instruction bus 146, respectively. Similar to the L1 caches, the shared L2 cache is also subdivided into areas for instruction cache (I-cache) and data cache (D-cache), and the D-cache is further subdivided into local and global areas to increase the cache hit rate. In an alternative embodiment, the L2 cache is unified for instructions and global data, while still having a separate local data area to increase the hit rate. Additionally, the instruction and data busses may be combined, as instruction/data busses, for better bus utilization. The L2 cache includes ports 150, 152, 154 so that the peripheral devices such as memory, PCI-X and TDM devices may be connected to the L2 cache through the ports.

L2 cache 112 may be configured with a built-in arithmetic logic unit to perform several control operations directed to the L2 cache management and memory control as well. The control operations of the L2 cache include the execution of a small set of atomic instructions, lock/unlock functions, read-modify-write functions and instruction/data delivery functions. The L2 cache may be lightly pipelined to accept multiple requests from other IPUs before the completion of a request from an IPU (i.e., accept new requests on each cycle from the IPUs while others are in progress). Further, the L2 cache may be optimized by having some directly addressed, non L2 cached memory at the L2 cache level of the chip, accessed at L2 cache speed. Critical interrupts and operating system code can be kept here, equivalent to a portion of the address space that is always cached. More detailed descriptions regarding the control operations in the L2 cache will follow in later sections.

[MPU 114, one of the other shared resources in Processor 100, is a complement processing resource for IPUs 102, 104, 106, 108 and is configured to perform relatively complex calculations of instructions such as multiply, divide and/or floating point calculations upon receiving requests from the IPUs. The MPU is configured to receive calculation requests from the IPUs with decoded opcodes and data via Router 110 along with data bus 140. Alternatively, the MPU may be configured to receive and execute encoded instructions with complex calculations forwarded from the IPUs. The calculation results are delivered via return data bus 148 to the requesting IPUs. The MPU may be lightly pipelined to deal with multiple requests from the IPUs before the completion of a request from an IPU (i.e., accepts new requests from the IPUs while others are in progress). For example, the MPU is pipelined with separate short pipes for floating point add/subtract, and integer/floating point multiply/divide operations. A state machine implements multi-sequence iterative functions such as integer/floating point divide, square root, polynomials and sum of products. These in turn may be used to efficiently implement more complex functions.

In one non-limiting implementation of Processor 100, a single MPU (e.g., MPU 114) is shared by multiple IPUs (e.g., IPUs 102, 104, 106, 108) using the silicon area more effectively when compared to a conventional processor with a similar size. The streamlined architecture of the IPU structure (e.g., 32 bit microcomputer) makes it practical to incorporate several of the IPUs on a single chip. Current conventional designs become even more inefficient in contrast to Processor 100 of the present invention as the effective area of silicon required becomes even greater when such conventional processors are duplicated and employed as monolithic structures in parallel.

The clock speed of Processor 100 may be modest when compared to the conventional processor and yet achieve similar processing throughput because greater execution throughput may be achieved by multiple processing resources (e.g., IPUs) running in concert without requiring higher clock rates. For example, Processor 100, a design with an MPU shared by four IPUs, may use a clock speed of 533 MHz for the same amount of, or even higher throughput compared to a conventional processor running at 2 GHz. The reduced clock speed renders several benefits including less complicated circuitry, less stages of pipelines, less heat problems and, reduced cost with improved accuracy and capabilities. Furthermore, such a design of the present invention allows for modern processing technologies to be employed in environments too harsh to employ conventional processor technology. For example, certain aerospace environments must employ old Intel 80386 processor technology because the harshness of space requires relatively large die cast mask implementations (e.g., 35 nm) as contrasted with current state of the art fabrication implementations (e.g., 10 nm), which reduces the amount of logic that may be supported on a single die. Processor 100 of the present invention may be implemented employing such a course fabrication technology utilizing the available silicon area more efficiently even at relatively low clock rates.

Figure 3:
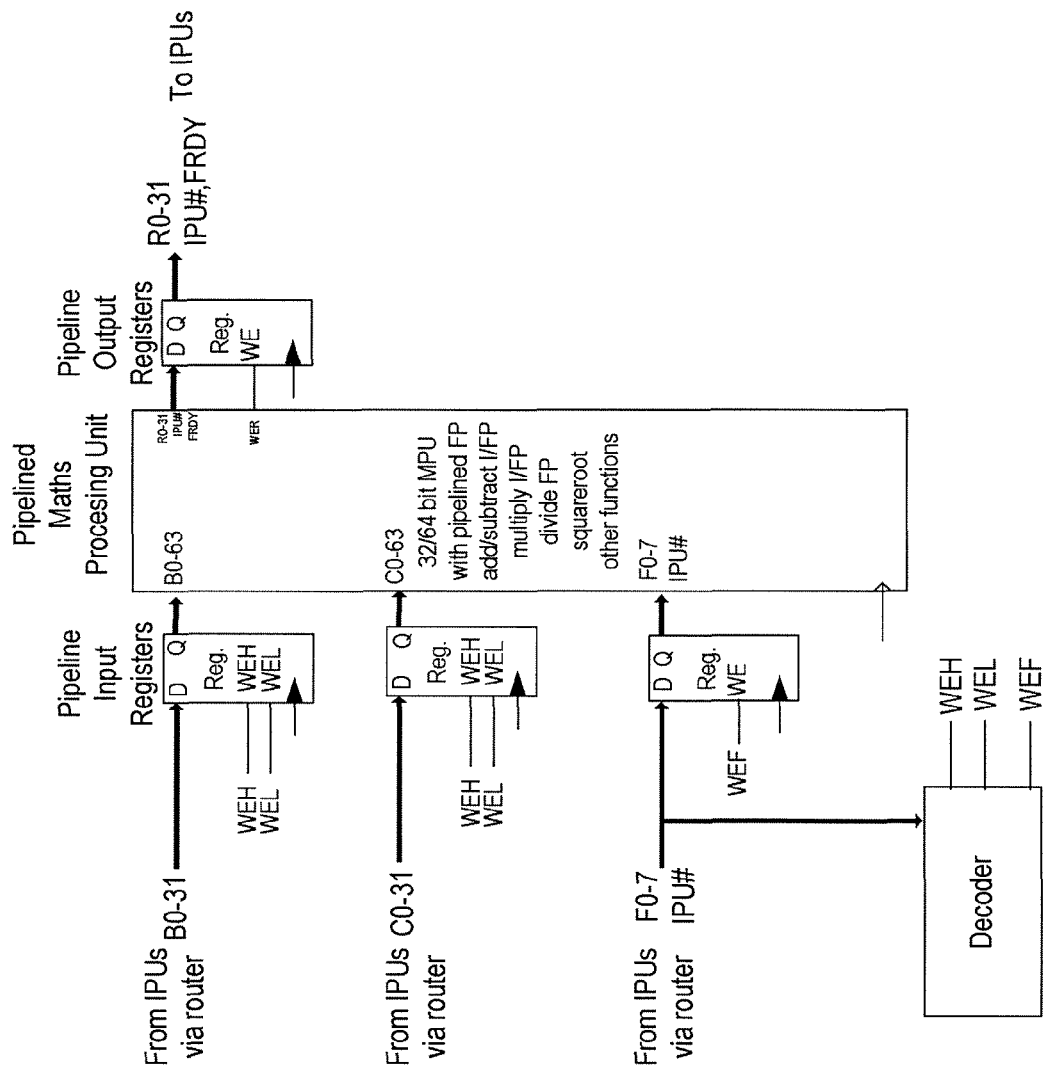
FIG. 3 is of a simplified schematic diagram illustrating one, non-limiting example, inventive aspect of the present disclosure of the data paths of integer processing unit requests from a router to a target processing resource of a processor.

FIG. 3 is of a simplified schematic diagram illustrating one, non-limiting example, inventive aspect of the present disclosure of the data paths of IPU requests from IPUs 102, 104, 106, 108 to a target processing resource such as MPU 114 of Processor 100.

If the arithmetic operation required is more complex than integer add, subtract or compare, or floating point sign/magnitude compare, the operation may not be executed by the IPU. Instead the B and C parameters of the complex arithmetic operation are loaded into the operand pipeline registers and a request issued for access to the shared MPU, which can accept a new operation into its pipeline or pipelines every clock cycle. If more than one IPUs request MPU service in the same cycle, the request from the IPU which is running at the highest priority is granted. The requests from the IPUs are pipelined with pipeline input registers. A decoder decodes the requests determining the requesting IPU number. The decoded number of a requesting IPU may be added to the output result at the pipeline output register. In the execute pipeline phase, an IPU may issue a request to the Router to connect to the shared MPU to execute, for example, a complex math instruction. On the next free cycle, the IPU may write the function parameters to the input registers of the MPU. If the instruction requires double precision, the writing of the function parameters may take two cycles. When the MPU has calculated the result, it returns the result on the dedicated return bus to all IPUs, with the IPU number of the corresponding request so the correct IPU will accept it. If the result is double precision, this may take two cycles as well.

Because a requesting IPU sleeps waiting for the result from the MPU, adjacent operations in the pipeline cannot be for the same IPU. This simplifies register bypassing in the MPU, eliminating the need for much of it.

The command set for the MPU operations includes integer multiply and divide, plus a full set of floating point operations. There is also a function pipeline which supports the usual set of logarithmic and trigonometric functions. There are enough spare operation commands to allow for further specialized coprocessors operating on similar principles.

Figure 4:
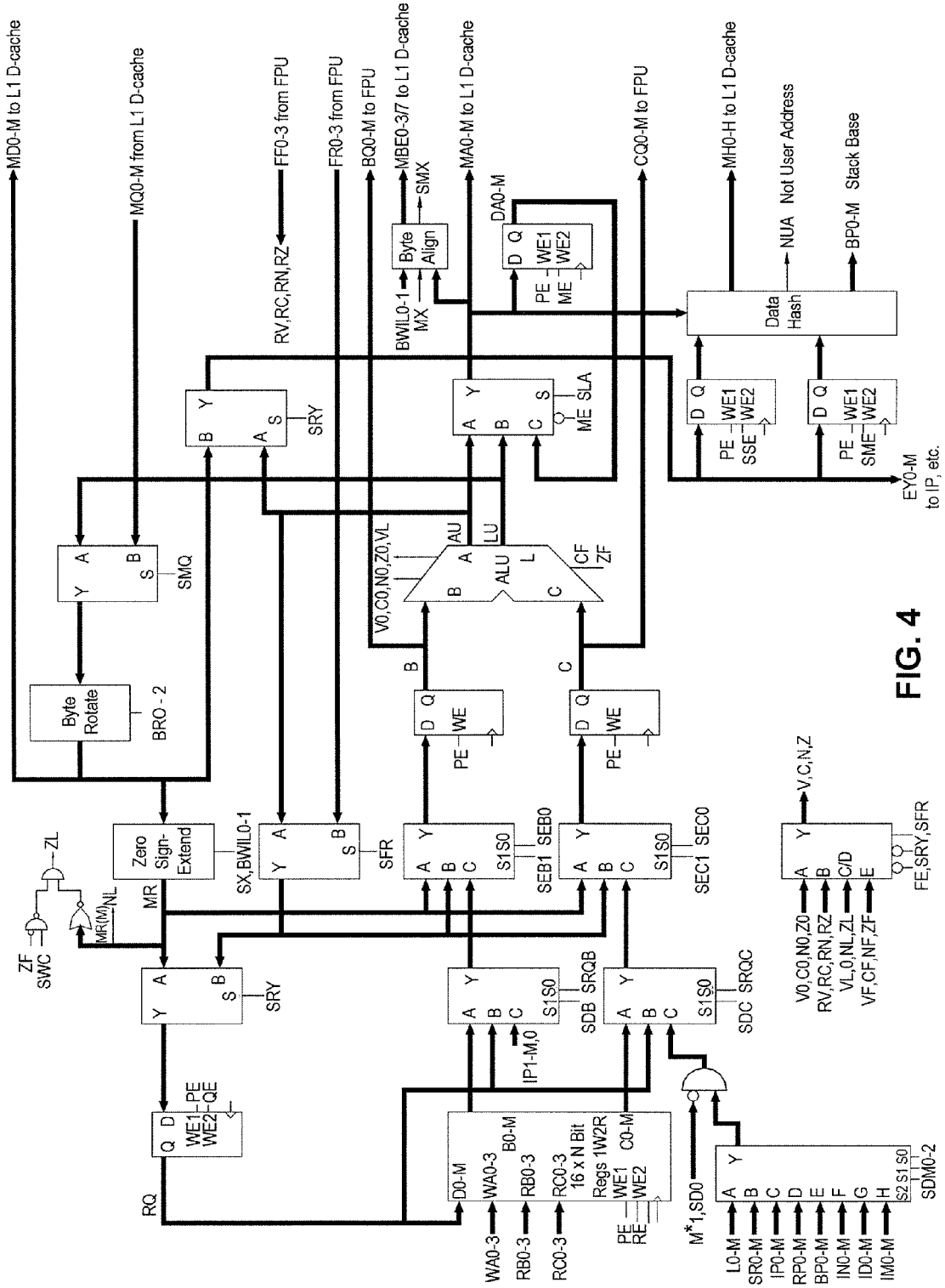
FIG. 4 is of a simplified schematic diagram illustrating one, non-limiting example, inventive aspect of the present disclosure of the data path of an integer processing unit of a processor.
Figure 6:
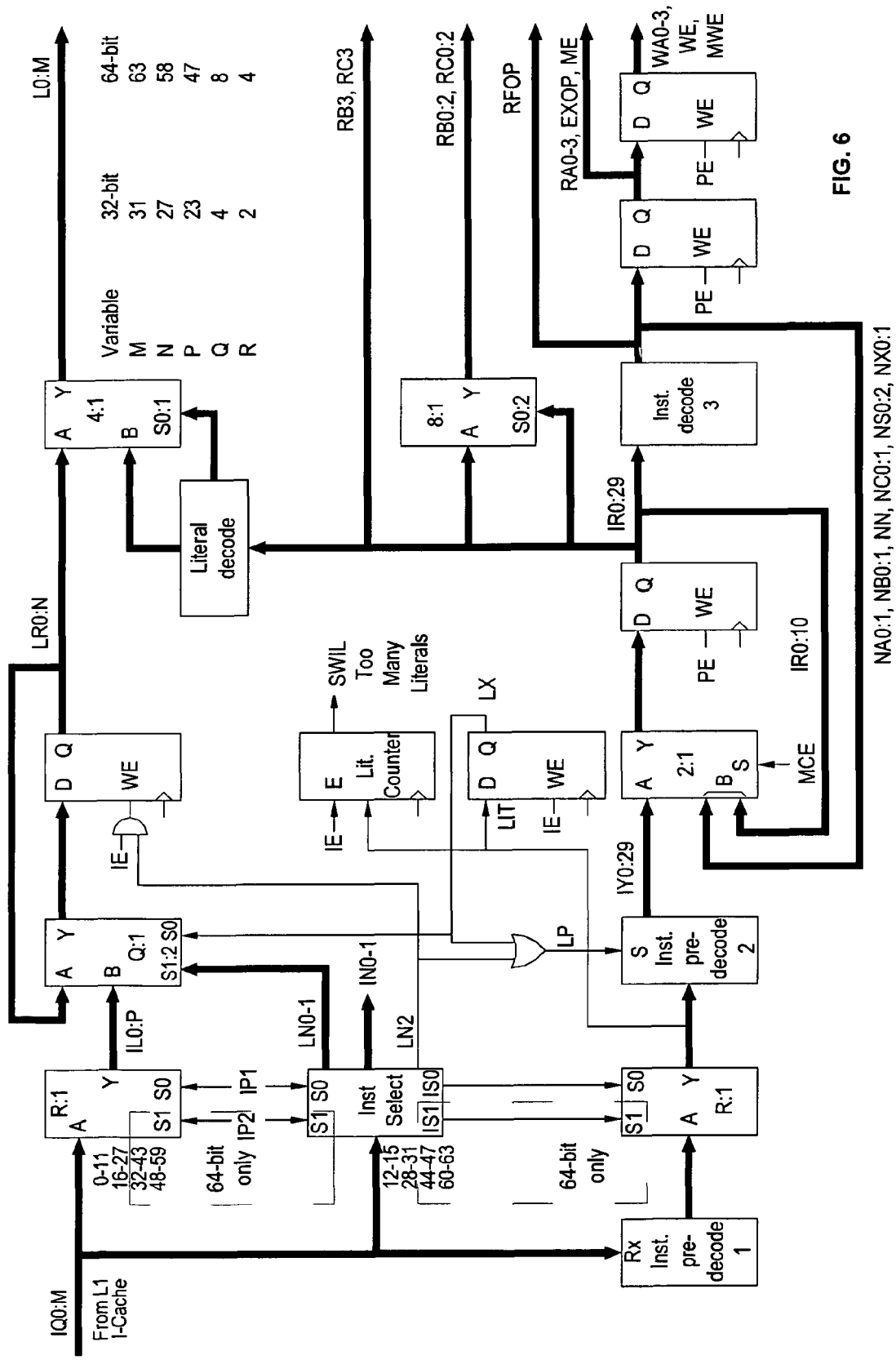
FIG. 6 is of a simplified schematic diagram illustrating one, non-limiting example, inventive aspect of the present disclosure of an instruction decoder of an integer processing unit of a processor.

FIG. 4 is of a simplified schematic diagram illustrating one, non-limiting example, inventive aspect of the present disclosure of the data path of an IPU such as IPUs 102, 104, 106, 108 of Processor 100. An exemplary embodiment of the IPU employs a 32-bit data bus structure as shown in FIG. 4. The data bus provides a data path for the various components comprising the IPU. Instructions are fetched from the memory devices (e.g., L-1 cache, L-2 cache or external memory devices) and decoded in an instruction decoder as shown in FIG. 6.

Every enabled clock cycle, the data path pipeline executes a new instruction. In the first data path pipeline stage, either a pair of registers or a register and a literal constant are loaded into two pipeline operand data registers, B and C, controlled by only a little instruction predecode logic during the instruction fetch pipeline stage. During this stage, the instruction is more fully decoded for the following stage. These registers include 16 general purpose registers (e.g., 16.times.32 bit registers) and the various other registers such as the instruction pointer or status register. Subsequently, the decoded addresses and data are stored at a 16.times.32 bit register space. The register space provides a set of high speed memory stores for the IPU and has three inputs for the selection of one of the 16 registers. The one more required bits for the selection of the registers come from the instruction decoder that interprets the operand of an instruction. FIGS. 21 and 22 describe this aspect of the invention in more detail.

The register space is connected to a general purpose Arithmetic Logic Unit (ALU) via multiplexers and the 32-bit operand pipeline registers. The ALU provides the arithmetic computations for data stored in the register space. In the following data path pipeline stage, the decoded operands are passed either to the ALU or to MPU 114 depending on the type of the required calculation. Multiplexers have an input from a status register, which stores selection information among the general purpose registers. The status register further stores information such as instruction pointers, return pointers, and/or the like. The ALU is configured to simultaneously execute an arithmetic add or subtract and a logic operation such as move, and not, or, xor, prioretize, barrel shift or rotate. Comparison operations include signed, unsigned, float and double. Minimum and maximum operations, signed, unsigned, float and double, are executed by doing a comparison operation of B and C in the arithmetic unit and using the result to select whether the logic unit passes B or C. Double precision operations are implemented as two single precision operations, with appropriate handling of zero and carry flags. Bit test and set operators return the zero flag according to the bit value at the test, before the set.

The output of the ALU is connected to the caches such as L1 and L2 through a multiplexer and register. The outputs from both the adder and the logic operations are available simultaneously, and pass through a number of multiplexors to a number of pipeline registers, each of which may independently be loaded with either of these outputs, or with the result of the MPU or memory access where appropriate. The register writeback pipeline register can be loaded with any of these, and it or they can be bypass multiplexed into the B or C operand registers if either one is the result register of the previous instruction or the one before that.

Alternatively, either the B or C register can be loaded from the result that is not being written back to a register. This is used to roughly halve the cycles in multicycle instructions by supporting two simultaneous data flows. This allows for interruptible multicycle vector operations to execute at about twice the speed of an equivalent software loop. The set of vector operations is extensive, covering most of the C string library plus vectored arithmetic including inner product.

The ALU may shift the C operand by 0-7 bits; left, right or rotate. This is used to scale subscripts for bit, byte, short, integer or long, or for part barrel shift. In the logic return data path, combined with both the read data and write data, there is a byte rotator which either completes a barrel shift or rotates memory data to alignment, and a byte, short or integer zero or sign extender. Memory write data also passed through these. Whichever source is multiplexed to the register writeback pipeline register, to be written to the actual register in the following cycle, has its set of flags selected to be stored in the status register.

The memory data address register may be loaded from either the arithmetic or logical units, allowing for all address arithmetic to take only one cycle, even autoincrement or decrement. The following cycle the data from the L1 D-cache is read unless there is a cache miss, and the cycle after that the address can be written to.

When the address register is loaded, a hash function of the address is computed and also loaded into a register. This hash is used to select a row in the cache in which the data and address are stored. Additional multiplexers and registers are configured to perform the hash function incorporating data type categorization requirements allowing locality information determination of the output data, thereby the output data may be apportioned and stored correctly between the local and global areas of the caches. When address arithmetic is performed, a hashed address may also be computed for L1 cache access. In the case of a data address, the highest bit of the hashed address may be a local/global classification, based on a bit-masked comparison of the data address and the local stack segment address. This may be varied to allow either local or global allocations to occupy greater or lesser percentages of cache space. The memory address hash function is special in that it distinguishes between local and global data in order to favor the former. The lower bits of the address register and the number of bytes being read or written are combined to emit byte strobes to the L 1 D-cache, which are used to gate individual bytes and to control nonaligned split word reads or writes, which require extra cycles. Thus read or writes do not have to be aligned, although they use extra cycles if they are not. This also minimizes the miss rate of the L1 D-cache.

Each of Branched Data Buses are connected to Router 110 for transmitting a request to the shared resources (e.g., L2-cache 112 and MPU 114). For example, the operand and/or data of an instruction that requires a complex calculation may be sent to the shared resources (e.g., MPU 114) before the ALU of the IPU performs the calculation.

Figure 5:
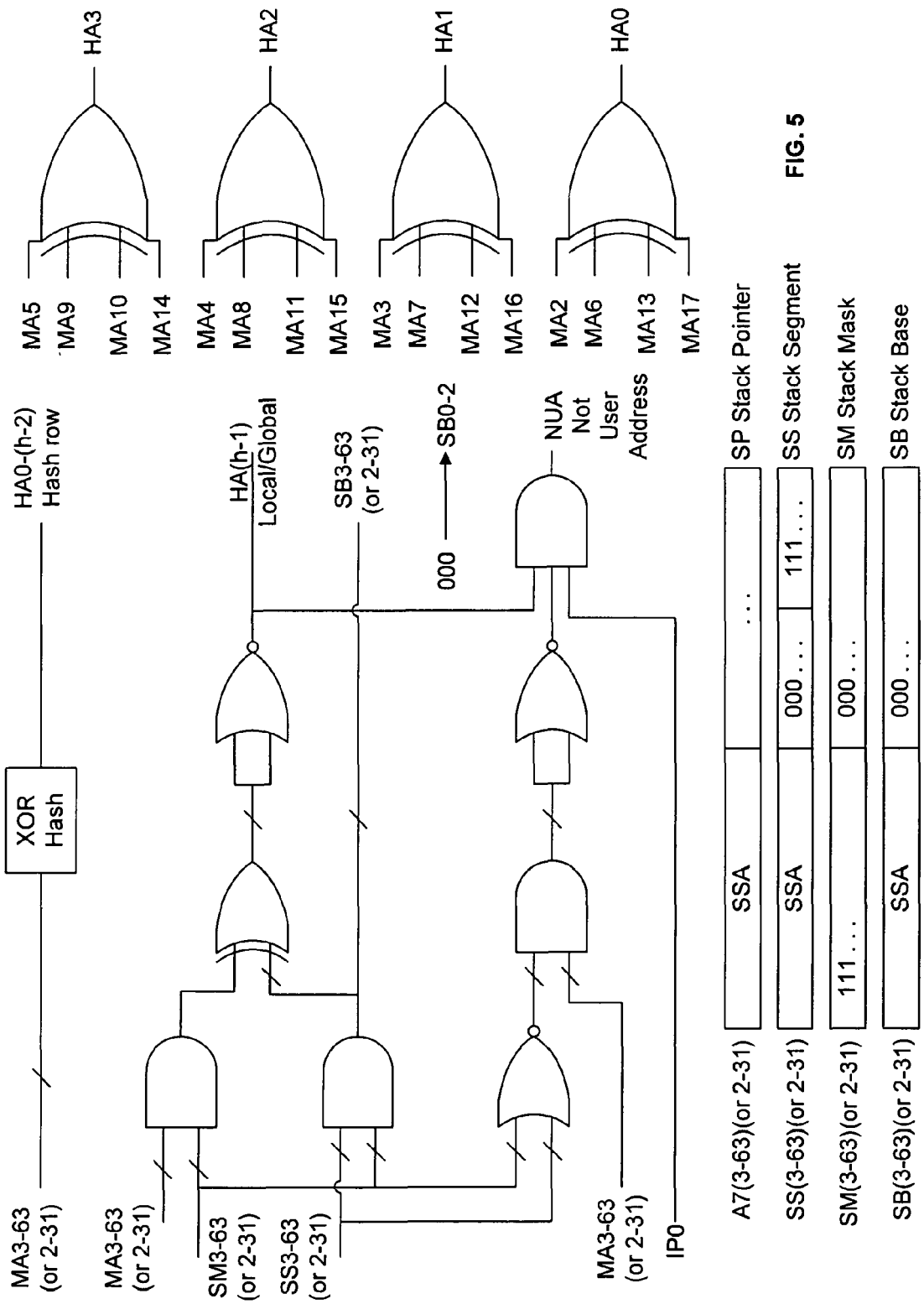
FIG. 5 is of a logic diagram illustrating one, non-limiting example, inventive aspect of the present disclosure of the hashing function which is connected to each of the outputs of integer processing units.

FIG. 5 is of a logic diagram illustrating one, non-limiting example, inventive aspect of the present disclosure of the hashing function which is connected to each of the outputs of IPUs 102, 104, 106, 108.

A cache memory (e.g., L1 cache or L2 cache) is addressed by a hashing function of the data address, which selects a cache memory row that the data may be stored in. This hashing function is usually the exclusive or (XOR) function of some of the address bits to a smaller number of bits. In this invention, when a data address is hashed, most bits are generated by a simple XOR hashing function, but one or more bits are used to subdivide the data cache into a local zone and a global zone. It is known that local data has much higher reuse rate than global data and it is desirable to bias the cache memory towards storing local data. As instructions cannot execute from local memory, instruction addresses are assumed global.

In an exemplary embodiment of a hashing function of the present invention, the top bit of the hashed address divides the data cache (e.g., L1 cache or L2 cache) into two halves. This bit is generated by determining if an address is local, that is that the address is within the limits of a segment of memory allocated by the operating system for use as the local data stack of the current process. This test may be made by simple logical comparisons of the address against a stack segment address register and a stack segment bitmask register. These segments are set up by the operating system when it allocates local memory for a process, and are not modifiable by a user program. The Stack Mask (SM) register is a bitmask that selects the high bits of the stack pointer address, which defines the size and limits of the stack segment. If the masked high bits of an address are equal to the masked high bits of the Stack Segment (SS) register, the address may be determined as a local. The low bits of the Stack Segment register define the size and limits of a system reserved area at the base of the stack segment. If an address is within this limit, it may be determined as local but not user usable, resulting in an interrupt to the operating system if in user mode, detecting stack overflow before it can damage other processes. Interrupts or operating system calls can use this area safely. If an operation alters the Stack Pointer register to a value not in the limits of the stack segment this also results in a stack overflow interrupt. Thus a user program cannot overflow its stack without being stopped before it can cause damage. This division of the data cache into local and global areas extends not only to the L1 cache but also to the L2 cache, because local data are not shared between processes.

FIG. 6 is of a simplified schematic diagram illustrating one, non-limiting example, inventive aspect of the present disclosure of an instruction decoder of an IPU such as IPUs 102, 104, 106, 108 of Processor 100. IPU instructions fetched from L1/L2 caches or memory devices are decoded in the instruction decoder and used in the IPUs for further execution. In an embodiment of the present invention, all IPU instructions are 16 bits in size. The IPU instructions are aligned in 32 or 64 bit words depending on whether the instructions are executed in a 32 bit IPU or a 64 bit IPU. Both the 32 bit and 64 bit IPUs may have the same architecture as shown in FIG. 6, but differ in word size and detail of instruction set.

Figure 18:
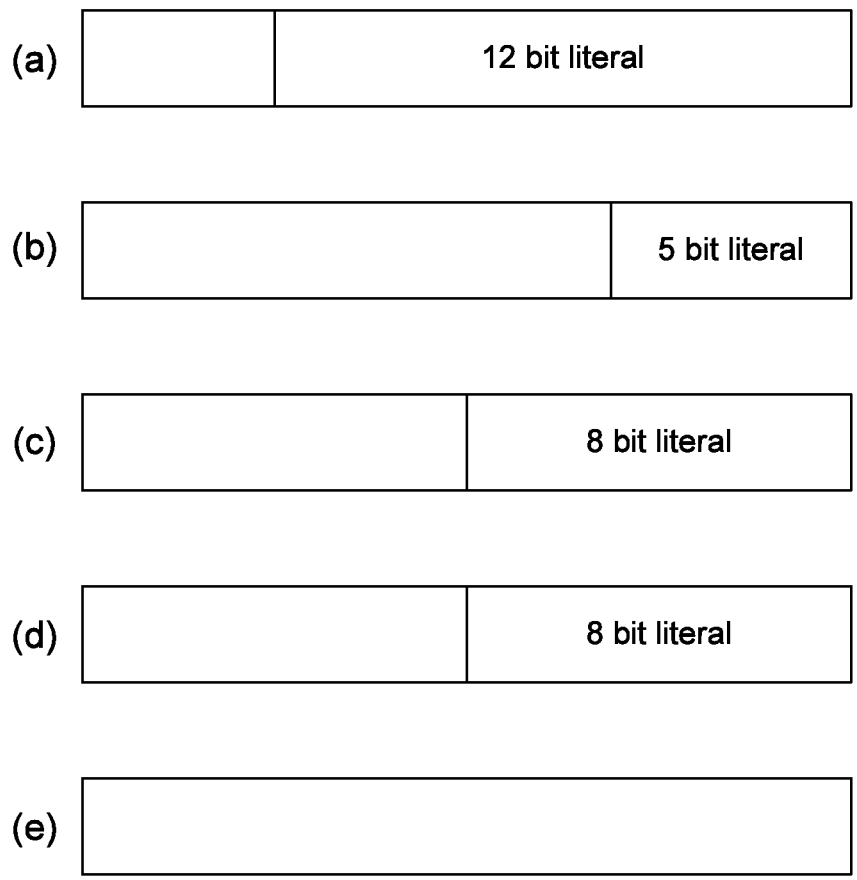

IPU Instructions are executed in a pipeline with a single or multicycle operation. Some of IPU instructions may contain a small literal constant, which may be extended with one or more literal prefix instructions. Literal prefixes are saved in the literal register until the prefixed instruction are executed in the IPU. Literal prefix instructions in the same word as the prefixed instruction are executed simultaneously, and thus, more than one instructions may be executed in a cycle (i.e., superscalar execution). The presence or absence of literal prefixes before an instruction constitutes a 17th instruction bit, which increases the number of instructions that can be encoded in 16 bits. There are some instructions that are always prefixed and some instructions that are never prefixed. These instructions share 16 bit opcodes and are distinguished by the 17th bit. The literal prefix instructions are described in more detail with FIG. 18.

While executing an instruction, the next instruction is fetched from the L1 or L2 I-cache or from external memory and predecoded. When the current instruction has executed, the next instruction is loaded into the instruction register and decoded in parallel with register fetch, which is controlled by the small amount of predecode logic. A literal constant, with any prefixes, is made available simultaneously with register fetch. In the following pipeline stage, the arithmetic and logic unit (ALU) executes the decoded instruction. The last pipeline stage is register writeback.

All controls for the data path pipeline come from the instruction decoder. Feedback from the instruction decoder controls multicycle instructions by modifying the instruction register and reexecuting it. Thus to the data path pipeline, a complex multicycle instruction appears to be a sequence of simple single cycle instructions. Even interruptible multicycle vector instructions are controlled in this simple manner. When a jump is taken, the following instruction has been fetched and is ready to be loaded into the instruction register, while the instruction jumped to is not fetched until the next cycle. The following instruction is annulled by loading it as a no operation and otherwise executing it normally. This is a pipeline bubble, and consumes roughly the same power as any other operation.

Instruction execution can sleep if there is an L1 cache miss or an MPU operation. In such a sleep, the pipeline clock is disabled and very little power is consumed until the memory or MPU operation completes and the clock is reenabled. The atomic lock operations also cause sleep, until the unlock operation. The sleep lock/unlock operations will be described in more detail with FIGS. 26, 27.

The pipeline has been designed to be as short, but the architecture is compatible with a longer pipeline if desired for higher clock frequency. It is a tradeoff between clock speed and the number of cycles per instruction.

FIG. 7 is of a simplified schematic diagram illustrating an alternative, non-limiting example, inventive aspect of the present disclosure of the data path of an IPU such as IPUs 102, 104, 106, 108 of Processor 100. The IPU is presented incorporating a 64-bit data bus structure. A 64-bit Arithmetic Logic Unit (ALU) is connected to a 64-bit general purpose register via multiplexers and 64-bit registers. The general flow of data of the IPU in this alternative embodiment is similar to the IPU of FIG. 4 with a 32-bit ALU.

Figure 8:
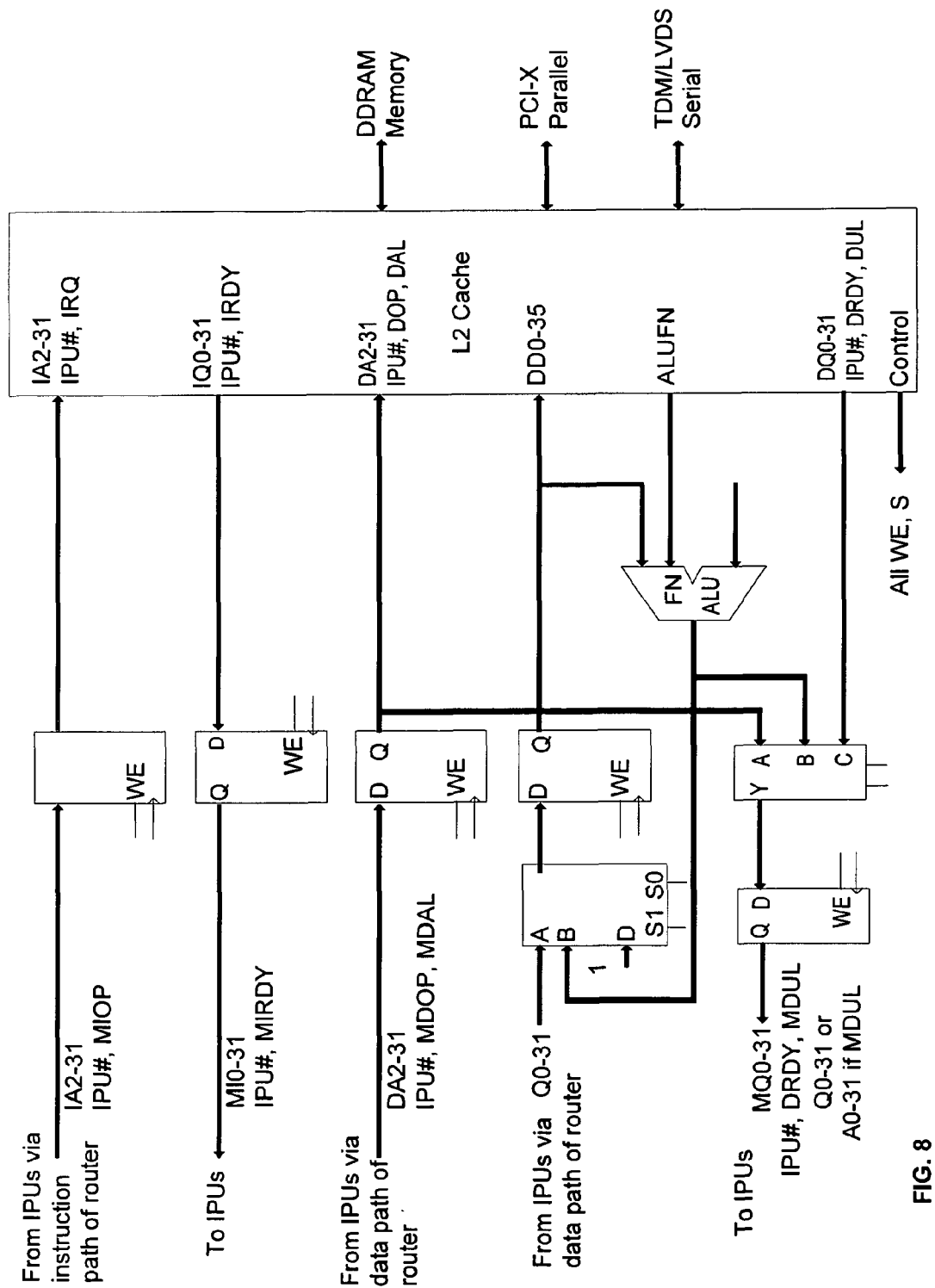
FIG. 8 is of a simplified schematic diagram illustrating one, non-limiting example, inventive aspect of the present disclosure of the instruction/data path of an external level two cache of a processor.

FIG. 8 is of a simplified schematic diagram illustrating one, non-limiting example, inventive aspect of the present disclosure of the instruction/data path of L2 cache 112 of Processor 100. If there is a miss on accessing the L1 I or D-cache, the IPU pipeline sleeps and a request is made for access to the shared L2 cache. Atomic memory operations bypass the L1 D-cache and directly request L2 cache access. The L2 cache access normally requires several clock cycles and is pipelined enabling the L2 cache to accept a new request every clock cycle.

The L2 cache has its own extra circuitry (e.g., a dedicated ALU) which allow the L2 cache to implement a set of atomic memory operations including a form of global atomic lock/unlock which is much more efficient than the conventional spinlocks. The extra circuitry may supports atomic read/modify/write commands in the L2 cache. With the read-modify-write operations in the L2 cache, the write data from the IPU is not written to the L2 cache as usual. Rather, the write data is combined with the previous data at the address and then written. The combination is either a simple arithmetic add or one of a few logical bit mask operations. The read-modify-write instructions are executed in the L2 cache using its own dedicated ALU multiplexed with its input and output pipeline registers. The L2 data cache input is configured to block further requests while executing such instructions, making them atomic instructions between the IPUs. This enables synchronization between the IPUs, obsoleting the spinlocks of the conventional processor designs. In the atomic instructions, the data at the address is first read into the L2 data cache output register, followed immediately by a write of data to the same address. Then, writing to the L2 cache ALU with the data read from the address allows for the result to be written to the address, atomically. Some of the possible L2 cache ALU operations include add, subtract, bit set and bit clear, which allow for atomic implementations of lock waiting, event waiting and semaphores. When an IPU executes a lock instruction, it sleeps if it cannot immediately acquire the lock. When an IPU executes an unlock instruction, the L2 data cache sends the result on the data bus tagged as unlock, with the IPU address. All IPUs that are asleep and/or awaiting an unlock of that address will wake and retry their lock instructions. If one succeeds and resumes execution, any others may continue to sleep until another unlock instruction frees the resource they require. Similar instructions allow IPUs to sleep awaiting an event bit to be set in an event bit mask. Other instructions implement semaphores, conditionally trapping to the operating system if a semaphore requires run or wait queue manipulation.

The L2 cache is not required to maintain cache coherency with each IPU's L1 cache. This is because disciplined programming is required to share global data, using global atomic lock, unlock or semaphore instructions to control access. A semaphore instruction is simply an atomic increment or decrement on the lock variable, with a software interrupt generated on the basis of the flags generated by the atomic operation, which invokes the operating system scheduler if needed. On an unlock or semaphore signal of departure from a critical region of code in which access to shared data is regulated, the L1 D-cache is flushed to L2 in order to purge the L1 cache of the very data it had regulated access to. This ensures cache coherency when needed, without any performance penalty otherwise. Cache coherency need only be maintained between the L2 caches of multiple chips in a cluster as shown in FIG. 1C, and even then only for atomic operations, which are few enough that they can afford an extra cycle for coherency. The L2 cache may also be flushed to off chip memory under program control as needed in device drivers.

General Operation

The general operation of Processor 100 will now be described with reference to the exemplary data processing system and architecture of FIGS. 1A, 1B and FIG. 2.

Operating systems that support multi-threading operation of application programs enable programmers to design the programs whose threaded parts can be executed concurrently. Further, modern operating systems generally run a substantial number of individual program processes at any given time. Accordingly, each of IPUs 102, 104, 106, 108 may run a separate program process and/or thread (hereinafter thread and process may be used interchangeably, unless otherwise specified) allocated by an operating system independently. Many operating systems schedule the instructions of a thread/process and thereby instructions and data for each thread allocated to an IPU is fetched and stored in the L1 cache of the IPU as well as in L2 cache 112 in advance. Alternatively, the IPU may fetch the instructions and data from the external memories into its relevant registers. Subsequently, the executed instructions and data may then be stored into the L1 cache as well as the L2 cache.

Each of IPUs 102, 104, 106, 108 executes instructions of an allocated thread by following processor fetch-execute-store sequences. Each of the IPUs may access their local caches (i.e., L1 caches 103, 105, 107, 109) to obtain information (i.e., instructions and/or data) required to execute the instructions. Each of the IPUs may also access shared L2 cache 112 through Router 110 to obtain the necessary information. The requested information from an IPU may then be delivered by the L2 cache via dedicated return paths 144, 146. If the required information is not found in the L2 cache, external memories 22, 24, 26, 28 may also be accessed by the L2 cache.

While executing allocated instructions from an execution thread in an IPU (e.g., IPU 102), an instruction that requires complicated calculation such as floating point and/or vector math calculation is detected during the decoding process of the instruction. Subsequently, IPU 102 extracts the operand (e.g., floating point number etc.) and opcode (e.g., multiply, divide etc.) from the instruction and sends them to MPU 114 through System Bus 116 and Router 110. Alternatively, the instruction with complicated calculation itself may be sent to the MPU without extracting the operand and opcode.

MPU 114, upon receiving a request from IPU 102 (i.e., a requesting IPU), performs the requested calculations based on the operand and opcode employing a fetch-execute-store sequence. The calculation results may then be delivered via dedicated return path 148 to the requesting IPU (i.e., IPU 102).

While executing allocated instructions of a thread in an IPU (e.g., IPU 102), during decoding, the IPU may detect an instruction that requires information from a region in memory that happens also to be in L2 cache 112. Subsequently, IPU 102 extracts from the instruction an address for the L2 cache and sends an access request to the L2 cache directed at the address through system bus 116 and Router 110. The L2 cache 112, upon receiving the request from IPU 102, accesses to the requested address and provides information (e.g., address or data) stored at the address to IPU 102 through dedicated return paths (i.e., buses 144, 146) by placing the information on the buses.

In particular, after a requesting IPU (e.g., IPU 102) provides a request to another processing resource (e.g., L2 cache 112 and/or MPU 114) independently, the requesting IPU may go to "sleep" until a responding processing resource (e.g., L2 cache 112 and/or MPU 114) returns the requested information. Sleep is an important capability of Processor 100. Sleep may be induced by a switch unit in an embodiment, which may be placed between a power or clock providing line-in to any processing resource. Upon instruction, the switch unit may act to switch off power or clock to the unit while waiting for a response thereby reducing the overall power requirements for Processor 100. The resulting outputs from a sleeping processing resource may be configured to be non-existing, and as such they do not interfere with other competing inputs. For example, if IPU 102 or MPU 114 is put to sleep, their outputs 116, 142 and 148 may not affect and are no longer interpreted as inputs at their destinations. The switch unit may be switched on by other processing units, typically, upon completion of a request at a shared resource (e.g., MPU 114) and/or freeing of a processing resource (e.g., a locked memory location being unlocked in L2 cache 112). Alternatively, various processing resources may be shut off upon instructional direction so as to save power. For example, in an environment where conserving power is desirable (e.g., a battery powered laptop computer), a program (e.g., an operating system) may instruct the processor to shut off various processing resources to extend battery longevity. In yet another alternative embodiment, such a program may dynamically turn on and off various processing resources to maintain a desired level of power draw while maximizing processing throughput In yet another embodiment, Processor 100 itself shuts off processing resources while idling. Alternatively, the delegating processing resource (e.g., IPUs 102, 104, 106, 108) may continue to operate when requested for concurrent processes.

The requesting processing resource (e.g., IPU 102) may "sleep" even longer if the servicing processing resources (e.g., L2 cache 112 and/or the MPU 114) are currently busy processing requests from other requesting resources. For example, after IPU 102 requests information (i.e., instruction and/or data) from L2 cache 112 with an address via Router 110, IPU 102 goes to "sleep" until the requested information returns from the L2 cache via the return paths (i.e., system bus 144, 146). The "sleeping" time duration for IPU 102 after the request depends on the status of the L2 cache as well as the priority level of requesting IPU 102. If the L2 cache can return the requested information to IPU 102 right away, IPU 102 may resume the next operation within a relatively short time period. However, if the address of the L2 cache is locked by another IPU (e.g., another IPU is using the area for the execution of semaphore instructions), IPU 102 has to "sleep" longer until the lock is released by the current owner of the address. The L2 cache may be configured to inform the requesting IPU (e.g., IPU 102) when a locked area of the L2 cache is released. That is, when the current owner releases a locked area, the L2 cache broadcasts the lock release information with an identification of a "sleeping" resource (e.g., IPU 102) via dedicated return path (e.g., system buses 144, 146). Upon receiving the lock release information from the L2 cache with the sleeping identifier, the "sleeping" resource "wakes up" and may retry its access request to the L2 cache. Alternatively, the L2 cache may return the requested information (e.g., address, data and/or instructions), not the lock release information, to the requesting IPU and thereby let the IPU resume processing using the received information from the L2 cache.

The collaboration between IPUs 102, 104, 106, 108 and MPU 114 uses a similar "sleep" and "wake up" protocol as described above with regard to the collaboration between the IPUs and L2 cache 112. For example, after a requesting IPU (e.g., IPU 102) requests a calculation from the MPU along with information (e.g., data and opcode) via Router 110, the requesting IPU goes to "sleep" until the requested information returns from the MPU via the return paths (e.g., system bus 148). The "sleeping" time duration for the requesting IPU after the request may vary depending on the status of the MPU as well as the priority level of the requesting IPU. If the MPU can return the result of the requested information to the requesting IPU right away, the requesting IPU may resume the next operation within a relatively short time period. However, if the MPU is busy with requests from other IPUs, the requesting IPU has to "sleep" longer until the MPU returns the result. Similar to the L2 cache, the MPU is also configured to broadcast the calculation result with an identification of the requesting IPU (i.e., IPU 102) to all of the IPUs via return path 148. Upon receiving the calculation result from the MPU with the identification, the "sleeping" IPU (i.e., IPU 102) "wakes up" to resume process using the returned result.

In every clock cycle, every IPU may send a request to one of the shared resources (i.e., L2 cache 112 and MPU 114). Since each shared resource can accept only one request per cycle, requests from the IPUs may be accepted according to a dynamic priority system. The other requests from non-selected requests may be deferred to next cycles and will be accepted later, one per cycle. For example, each IPU may be assigned a low (0), medium (1) or high (2) priority at any given time. The low priority may indicate that the IPU is running a program normally. The medium priority may indicate that the IPU is running with a lock or servicing an interrupt temporarily. The high priority may indicate that the IPU is running with a super-priority instructions set (e.g., running no program and servicing interrupts only). When this priority is not enough to select an IPU because of multiple requesters at the same time, another priority scheme such as the round robin priority may be used based on the last satisfied request. The priority determination hardware may contact the multiplexers of Router 110 that routes the selected request to the input pipeline registers of each of the shared resources along with the requesting IPU number, request code, request operands, etc.

Several cycles later, the result from the shared resources may be broadcast on shared result buses 144, 146, 148 to all IPUs. Each sleeping switch unit at an IPU "looks" at the result buses for its IPU number. When a sleeping IPU detects a match, the IPU routes the broadcast result to its register and wakes up from the sleep. Sleeping may be accomplished by gating the clock off to the requesting IPU with a switch unit, and waking by gating the clock on again. However, the lock/unlock request, which is a request to the L2 D-cache, may be configured as an exception. For example, if the lock request is not granted on the first cycle, it is simply withdrawn and retried only after an unlock on the same address. The result of the lock/unlock request may simply be the address of the lock. Not only does this address signal from the L2 cache wake up the IPU that requested the unlock, but it also wakes any IPU sleeping on the same lock address, causing them to retry their lock request. Alternatively, the L2 cache may be configured to return the requested results from the requesting IPUs depending on the priority levels of the IPUs.

Additionally, a uniquely designed cache policy between L1 caches 103, 105, 107 109 and L2 cache 112 of the present invention makes it possible to manage the caches without using a complicated protocol as is used in conventional multiprocessor architectures. For example, after an IPU (e.g., IPU 102) executes semaphore instructions completing a high level critical region, or after IPU 102 executes lock/unlock instructions completing a low level critical region, all the hot global data in the corresponding L1 cache 103 is flushed and copied to the L2 cache global area. The hot global data indicates accessed and modified data during the execution of, for example, the semaphore instructions and/or lock/unlock instructions. Other data except the hot global data may be simply discarded. Further, when IPU 102 reschedules threads, unless the next thread is the same as before, the local and global data in L1 cache 103 is flushed to the local and global areas of the L2 cache. These policies substantially eliminate cache coherency problems between the L1 caches and the L2 cache.

Although, the general operation of the processor was described with regard to IPU 102, other IPUs 104, 106, 108, independently and concurrently operated, have similar capabilities and the same explanation may be equally applied to the other IPUs.

Request Delegation

Figure 9:
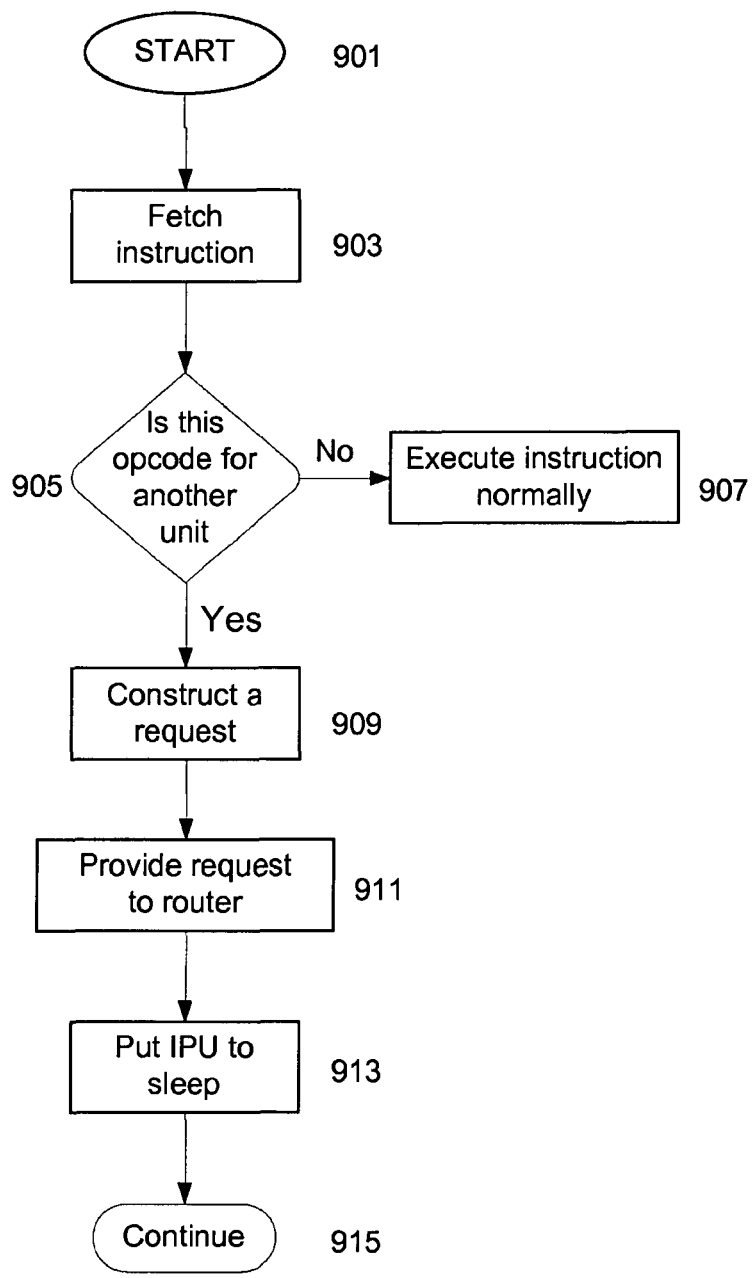
FIG. 9 is of a flow diagram illustrating one, non-limiting example, inventive aspect of the present disclosure providing a resource delegation process in an integer processing unit in which the integer processing unit constructs and delegates a request to other processing resources.

FIG. 9 is of a flow diagram illustrating one, non-limiting example, inventive aspect of the present disclosure providing a resource delegation process in IPUs 102, 104, 106, 108 of Processor 100 in which a requesting IPU constructs and delegates a request to other processing resources (e.g., L2 cache 112 and/or MPU 114).

The general operation iterative flow for a delegation process in one of an IPU (e.g., IPU 102) may be summarized as: (1) the constructing of a request if necessary to a delegated resource, (2) routing the request, and (3) obtaining a response from the delegated resource at the requesting unit. At some point, an instruction is fetched for the requesting IPU 903. Upon obtaining an execution-instruction, a determination is made by the IPU if the instruction is intended for execution on one of the other processing resources (e.g., L2 cache 112 and/or MPU 114) based on the decoding of the opcode of the instruction 905. For example, if the opcode indicates that an adding or subtracting calculation is required, and no information is required from the external cache (i.e., L2 cache 112), the instruction then may be executed in the IPU without delegation 907. If, however, the opcode indicates that at least one of the other processing resources is required to service the instruction (e.g., a multiplication or division calculations, or information from the L2 cache is required for the execution), then a request may be constructed by the IPU 909. For example, in constructing the request, the IPU may combine several information such as the IPU number, decoded opcode, values from the status registers and priority bit status registers (e.g., lock/unlock/interrupt hardware priority bit). Subsequently, the IPU provides the constructed request to Router 110 911. Upon providing the request to the Router, the IPU is put to sleep and waits for a reply or for a request for the IPU to wake 913.

Figure 10:
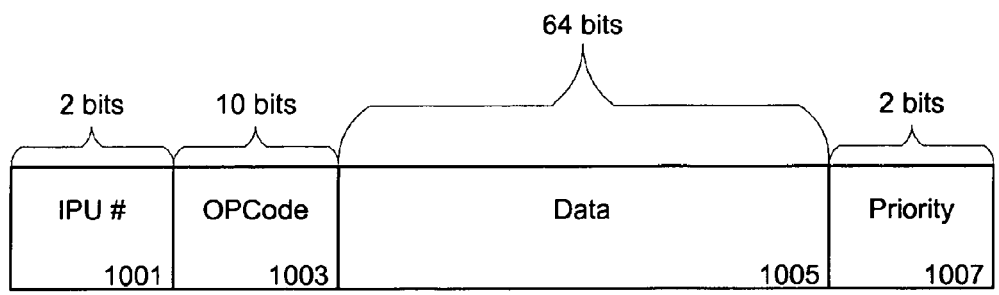
FIG. 10 is of a block diagram illustrating one, non-limiting example, inventive aspect of the present disclosure providing a form of a delegation request constructed at a requesting integer processing unit and directed to a mathematical processing unit.

FIG. 10 is of a block diagram illustrating one, non-limiting example, inventive aspect of the present disclosure providing a form of a delegation request constructed at a requesting IPU and directed to MPU 114. The exemplary MPU request includes information regarding the ID number of an IPU (1001), opcode of an instruction (1003), data (1005), and priority level (1007).

The IPU ID number component (1001) comprises enough bits to uniquely identify an IPU. For example, with a two-bit IPU number, an IPU may designate any one of IPUs 103, 105, 107, 109 and provides an identifier so that subsequent receiving and delegated resources may properly address a reply. In one non-limiting example embodiment, such an IPU number is provided in hardwired form within the IPU, but in alternative embodiments, such a value may be provided within a specialized register. Of course, a single IPU embodiment may be employed where no IPU number is required.

The exemplary MPU request includes a ten-bit operation code component (1003). The ten-bit opcode section defines the calculation to be performed in the MPU (e.g., multiply or divide etc). The opcode section may also act as an identifier for a destination processing resource (i.e., MPU 114). This pointer may be provided by decoding the operation code, which inherently targets a resource capable of processing the operation. The operation-code may be obtained from the opcode part of the instruction register. For example, if the opcode indicates that a multiplication or dividing calculation is required, it can be determined that the destination resource is the MPU. If, however, the opcode indicates that a read operation is required, it can be determined that the destination resource is L2 cache 112, not the MPU.

The exemplary MPU request may also include a data component (1005). The data component comprises 64-bits and may also include an operand. The values for the data section may be obtained from data registers within a requesting IPU.

The exemplary MPU request may also include a priority component (1007). The priority component may comprise 2 bits and the values may be obtained from the status register of a requesting IPU. The priority bit may represent a lock, an unlock, a hardware interrupt and/or the like, as provided either by the requesting IPU or by software generated interrupts.

Figure 11:
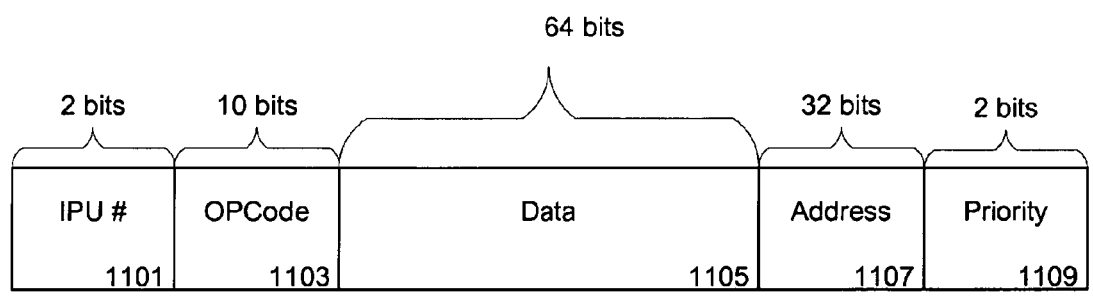
FIG. 11 is of a block diagram illustrating one, non-limiting example, inventive aspect of the present disclosure providing a form of a delegation request constructed at a requesting integer processing unit and directed to an external level two cache of a processor.

FIG. 11 is of a block diagram illustrating one, non-limiting example, inventive aspect of the present disclosure providing a form of a delegation request constructed at a requesting IPU and directed to L2 cache 112. Similar to the MPU request, the exemplary L2 cache request includes information regarding the ID number of an IPU 1101, opcode of an instruction 1103, data 1105, address 1107 and priority level 1109. In particular, the L2 cache request may include a 32-bit address component 1107 which designates the targeted address of the L2 cache and/or memory.

FIG. 12 is of a flow diagram illustrating one, non-limiting example, inventive aspect of the present disclosure of request handling in Router 110 of Processor 100 routing requests between the requesting processing resources and servicing processing resources. It should be noted that throughout, for sake of clarity, IPUs 102, 104, 106, 108 may be illustrative of any requesting processing resources, while L2 cache 112 and/or MPU 114 may be illustrative of any servicing processing resources. Regardless of the types of the requests (e.g., an MPU request or a cache request), each request is constructed within a requesting processing resource and provided to Router 110 as a unitary request.

A requesting IPU (e.g., IPU 102) delegates a request to Router 110 that further routes the request to a resource capable of processing the delegated request 1203. As the request is provided, the router iterates a priority deadlock bit 1205. The priority deadlock bit in an exemplary embodiment is within the Router itself, but in alternative embodiments the priority deadlock bit may be located elsewhere within Processor 100. By iterating the deadlock bit, the Router is capable of properly managing and forwarding the request to a resource that is available and prevents the forwarding of a request to resources that are busy. Further, the deadlock bit resolves the situation when more than one requesting entity is requesting the same resource. Depending upon the number and types of shared resources available within Processor 100, the number of deadlock bits may be expanded or reduced so that proper routing to each of the available resources within Processor 100 may be achieved. Thus, with log 2 (the number of requesting IPUs) bits, the deadlock bits will ensure proper routing. For example, for four requesting IPUs, two deadlock bits (log.sub.24) are required.

At some point, Router 110 examines the priority bits of a request 1207 based on the information from the priority deadlock bit. Subsequently, by examining the ID numbers of the requesting IPU and information from the priority bits of the request, the Router determines the priority of the request and also determines the identity of a servicing processing resource (e.g., L2 cache 112 or MPU 114) 1209. Thus, upon being presented with a request, the Router will make a deterministic decision to which resource a request ought to be provided.

Router 110 then determines whether more than one IPU is requesting the same resource 1211. If only one IPU requested the same resource, then the Router may simply select the request 1213. Further, the Router determines whether more than one IPU has presented the Router with a request at the same priority (e.g., a priority at the highest setting) 1215. If it is determined that there are no requests with the same priority, the Router may simply select one request with a highest priority 1213. If it is determined that there is more than one IPU with the same priority, the Router may select a presented request based on the deadlock bit 1215. In one non-limiting example embodiment, the deadlock between two or more requests with the same priority is broken by selecting the request that is closest to the iterated identifier of the deadlock bit. For example, if there are four IPUs making the requests, the deadlock bits may be iterated from 0 to 3, where each state of iteration represents each of the four IPUs that potentially may make a request. In such an example, if the deadlock bit has been iterated to a value of one and the two requests that have the same priority are emanating from IPUs number 3 and 4, then the request coming from IPU number 3 will win the deadlock because its value (e.g., IPU number 3) is closer to the current deadlock state (e.g., deadlock counter value 1).

Upon selecting a request 1213, 1215, the request chosen is forwarded to the input register of the targeted resource minus any priority bits 1217. Alternatively, priority bits are preserved so that there are multiple levels of delegation that may be achieved. Also, a request-granted-acknowledgement signal may be sent to the requesting IPU 1219. This may have the effect of clearing the IPU opcode in requesting IPU that sent the request 1221. Processing then may continue and iterate at the Router 1223.

Figure 13:
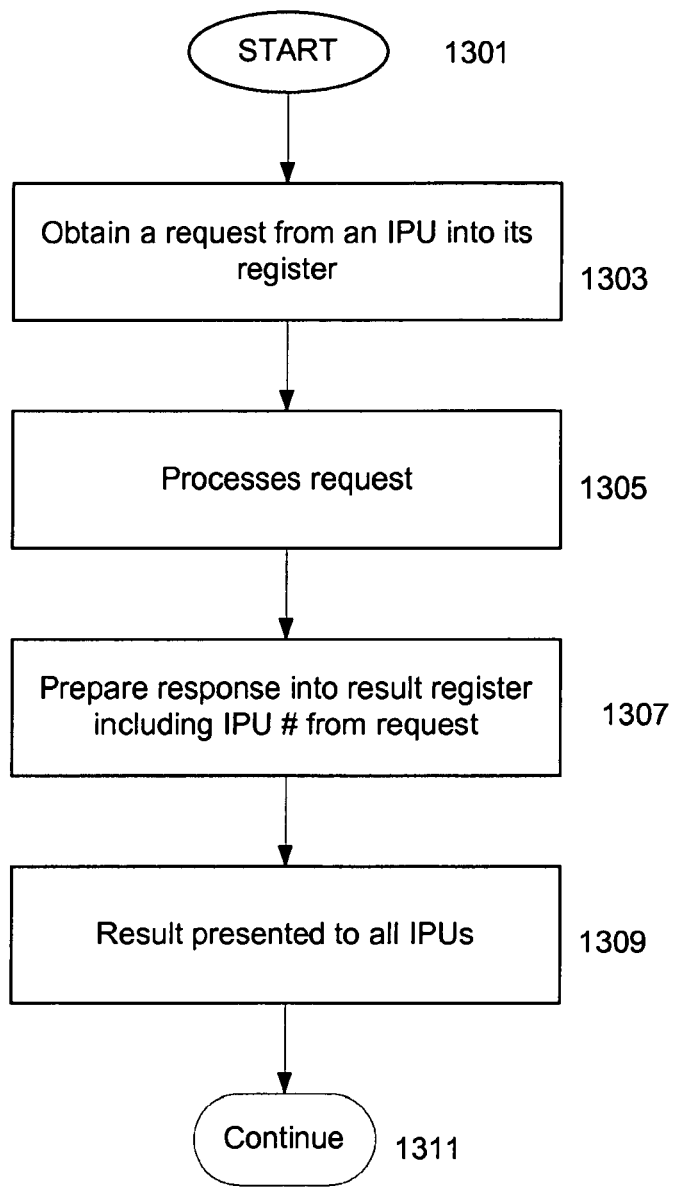
FIG. 13 is of a flow diagram illustrating one, non-limiting example, inventive aspect of the present disclosure of a response from a target processing resource to the requesting processing resource.

FIG. 13 is of a flow diagram illustrating one, non-limiting example, inventive aspect of the present disclosure of a response from a target processing resource (e.g., L2 cache 112 or MPU 114) to the requesting processing resource (e.g., IPU 102, 104, 106, 108). A request from an IPU is received into registers of a desired processing resource (i.e., L2 cache 112 or MPU 114) via Router 110 1303. Upon receiving such a request, the desired processing resource executes the request 1305. Such execution may involve accessing an address at the L2 cache or performing a calculation at the MPU based on the opcode provided from the request Upon processing the request, a response is prepared into a result register of the target processing resource, which includes the identification number of the requesting IPU 1307. Subsequently, the result from the result register of the target resource is presented to all requesting processing resources capable of making requests 1309 by, for example, broadcasting the result to the requesting processing resources. As the response is provided to all the IPUs capable of making requests, if a shared resource (e.g., an addressable memory space) is freed or released from a lock operation, any IPUs that are sleeping in wait for such a locked resource may awaken. Also as the result includes the IPU number of the originally requesting IPU, the results may be obtained and used by the respective requesting IPU.

Figure 14:
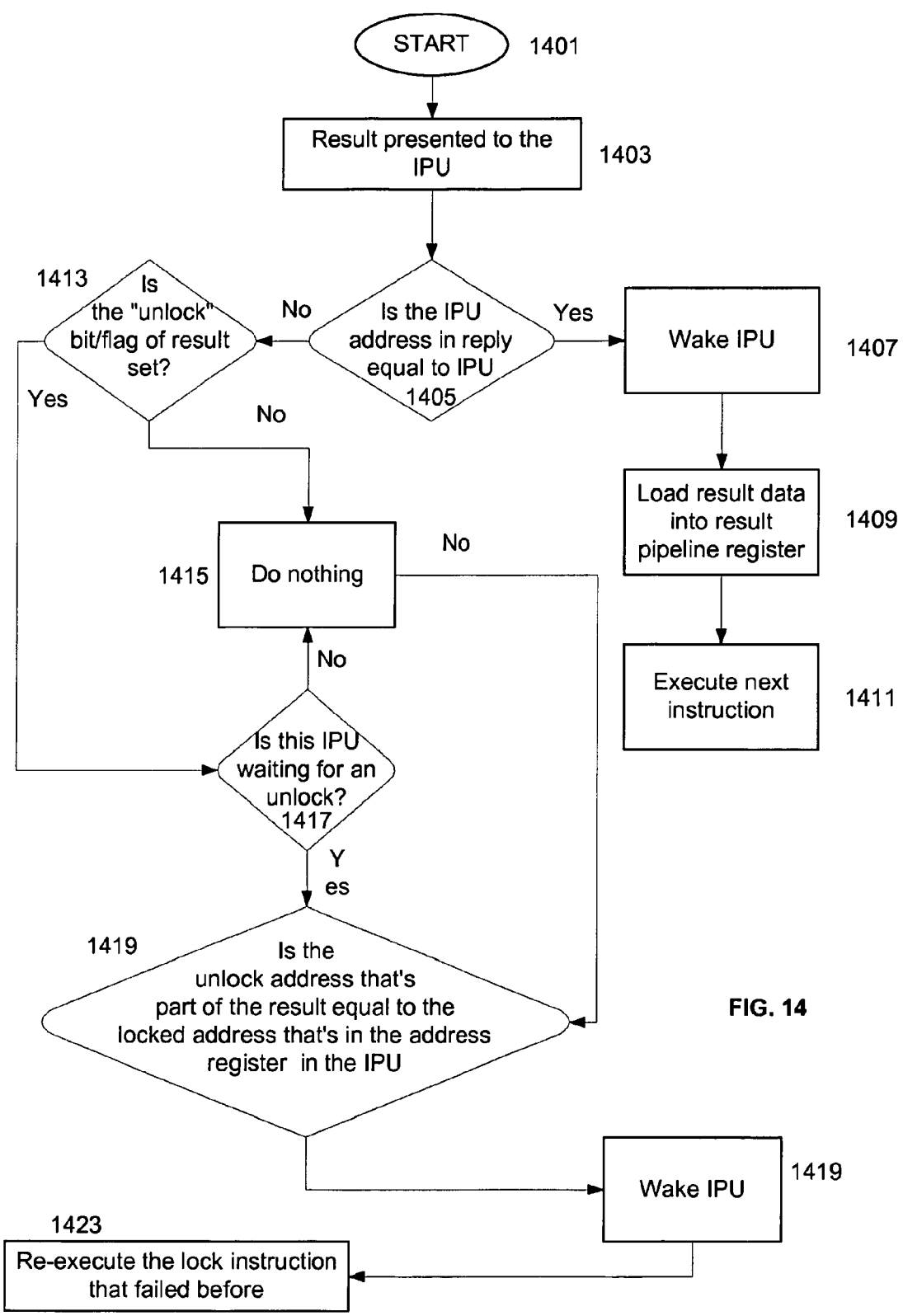
FIG. 14 is of a flow diagram illustrating one, non-limiting example, inventive aspect of the present disclosure of routing a result from a target processing resource to delegating processing resources.

FIG. 14 is of a flow diagram illustrating one, non-limiting example, inventive aspect of the present disclosure of routing a result from a target processing resource (e.g., L2 cache 112 or MPU 114) to delegating processing resources (e.g., IPUs 102, 104, 106, 108). As has already been discussed in FIG. 13, the result is presented to all IPUs capable of making requests 1403. Upon receiving the result from the target processing resource, each of the delegating processing resources determines if its IPU number is equal to an IPU number in the presented result 1405. If the IPU number in the presented result is equal to the IPU number of the instant IPU meaning that the presented result is in response to the request from the instant IPU, the instant IPU is told to wake 1407. In one non-limiting example embodiment, the instant IPU is woken by receiving a signal from comparison circuitry, which compares the IPU number in the result and the instant IPU number. The IPU numbers may be hardwired into each of the IPUs so as to differentiate multiple IPUs from one another. Upon being instructed to wake 1407, the result from the target processing resource is loaded into the result pipeline register of the instant IPU 1409. Thereafter, the instant IPU may execute the next instruction 1411.

If the IPU number in the presented result is not equal to the IPU number of the instant IPU 1405, a determination is made if an unlock bit/flag is set within the presented result 1413. If no such unlock bit/flag is set, the IPU does nothing and may keep on sleeping 1415. If an unlock bit/flag is set in the presented result 1413, then a determination is made regarding if the instant IPU is waiting for an unlock 1417. If the instant IPU is not waiting for an unlock instruction, the instant IPU does nothing and may keep on sleeping 1415. If it is determined that the instant IPU is waiting for an unlock 915, another determination is made whether the unlock address that is part of the presented result is equal to the locked address that is in the address register of the IPU 1419. If the unlock address that is part of the presented result is not equal to the locked address that is in the address register of the instant IPU, then the instant IPU will do nothing again and may keep on sleeping 1415. If it is determined that the two addresses (i.e., unlock and lock addresses) are equal 1419, then the IPU will be instructed to wake 1421. Upon waking, the IPU will retry executing the locked instruction that previously failed and caused its sleep 1423.

Such delegation of execution-instructions through Router 110 allows Processor 100 of the present invention to operate in an asynchronous or synchronous manner. As has been demonstrated above, various processing resources may wait for variable amounts of time and not interrupt the operation of other processing resources. Such flexibility in the execution of instructions results in significantly increased processing throughput and more efficient usage of power.

Sleep Lock

Figure 15:
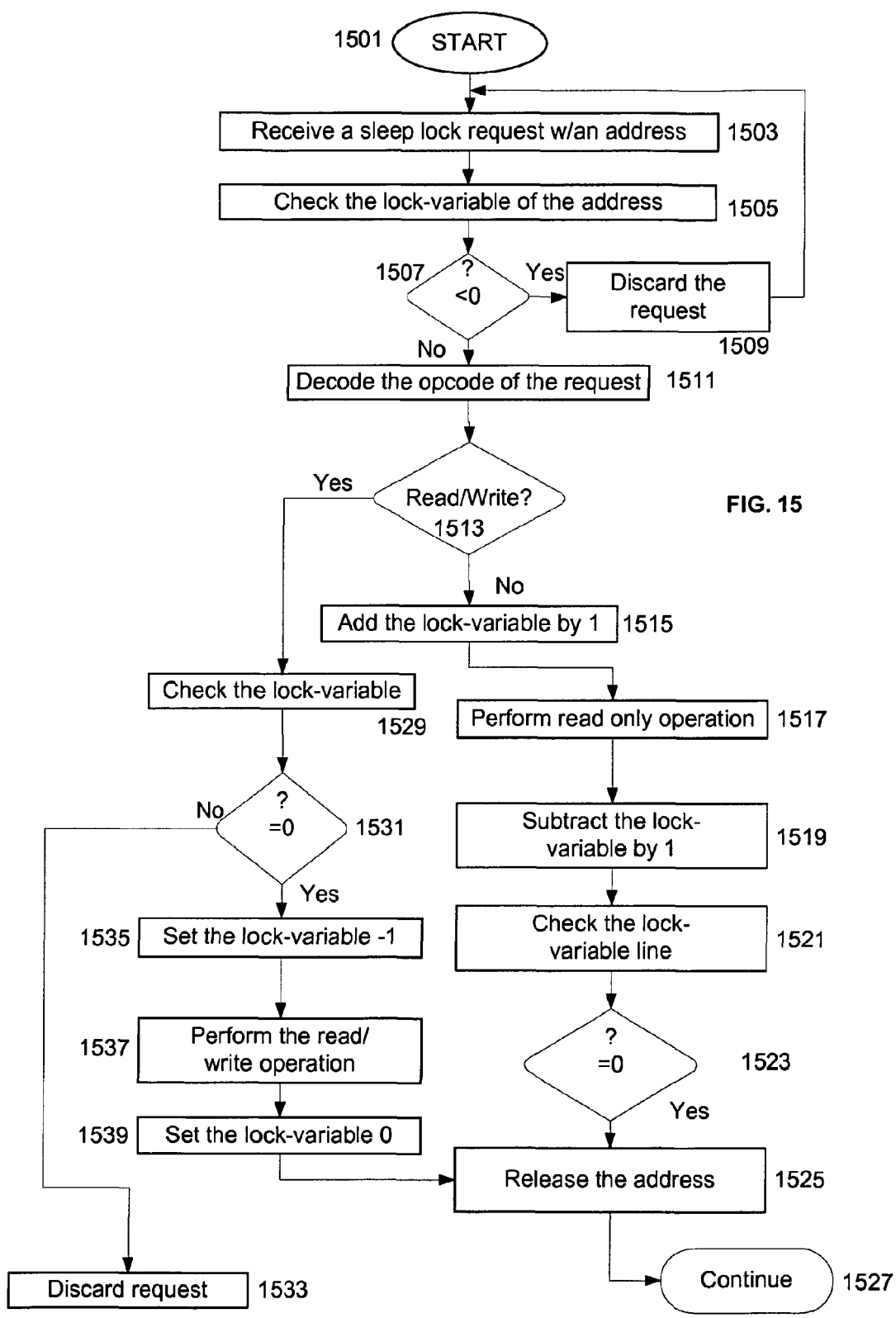
FIG. 15 is of a flow diagram illustrating one, non-limiting example, inventive aspect of the present disclosure providing a sleep lock operation in an external cache of a processor.

FIG. 15 is of a flow diagram illustrating one, non-limiting example, inventive aspect of the present disclosure providing a sleep lock operation in L2 cache 112 of Processor 100. Initially, the L2 cache is presented with a sleep lock request from a requesting IPU via Router 110 1503. The request may be in a similar form constructed by the requesting IPU as shown in FIG. 11. As the cache may be presented with several other routed requests from requesting resources, the L2 cache (i.e., data optimizing cache) may check the target address provided in the presented request to determine if the address is locked based on its locked variable 1505. For example, the lock-variable of negative numbers (e.g., −1) may indicate that the address is read/write locked by another request. A lock-variable of zero may indicate that the address is unlocked and available for any type of operation (e.g., read/write or read-only). A lock-variable of positive numbers (e.g., 1, 2, 3 . . . ) may indicate that the address is available only for a read-only operation. Subsequently, it is determined if the lock-variable is less than zero 1507. If the lock-variable is less than zero (e.g., −1), that means the address is read/write locked by another request and the request may be discarded 1509. The requesting IPU may try again in a later cycle for the same address. If the lock-variable is not less than zero (e.g., 0, 1, 2, 3 . . . ), the L2 cache decodes the opcode of the received request 1511, and further determines whether the opcode indicates a read/write lock operation 1513.

If it is determined that the opcode does not indicate a read/write lock operation (i.e., a read-only operation), L2 cache 112 adds one to the lock-variable 1515 and subsequently performs a read-only operation by reading shared data at the address 1517. The L2 cache may return the performed result to the requesting IPU by adding the identification number of the requesting IPU. Upon completing the read-only operation, the L2 cache subtracts from the value of the lock-variable by one 1519. The L2 cache then checks the lock-variable again 1521 and it is determined whether the lock-variable is zero 1523. If the lock-variable is zero (i.e., no other pending read-only requests exist for the address), the L2 cache may release the address 1525 for all type of operation (e.g., read/write operation etc). The L2 cache may then continue for other operations such as going back to 1503 receive further requests.

If it is determined that the opcode indicates the read/write lock operation is required 1611, L2 cache 112 may check the lock-variable 1529 and it is determined if the lock-variable is zero 1531. If the lock-variable is not zero indicating the address is read-only locked by another request, the L2 cache may simply discard the request 1533. If the lock-variable is zero indicating that the address is available, the L2 cache may set the lock-variable as minus one 1535. The L2 cache then may perform the read/write lock operation by reading/writing the shared data at the address 1537. The L2 cache may return the executed result to the requesting IPU by adding the identification number of the requesting IPU. Upon completing the read/write lock operation, the L2 cache may set the lock-variable back to zero 1539 and release the address 1525. The L2 cache may then continue for other operations such as going back to operations 1503 to receive further requests.

The following Table 1 further illustrates exemplary sequences to execute the sleep-lock operations in an address A of L2 cache 112 with requests from multiple IPUs (i.e., IPU 102, IPU 104, IPU 106) of Processor 100. It is assumed that the priority of the IPUs is in the order of IPU 102, IPU 104 and IPU 106 from highest to lowest, respectively.

TABLE 1

| Sequence | Lock-variable of address A | Request of IPU 102 | Request of IPU 104 | Request of IPU 106 |
|---|---|---|---|---|
| 1 | 0 | Read-only lock | | |
| 2 | 1 | Read data | Read-only lock | Read/write lock |
| 3 | 2 | Unlock | Read data | |
| 4 | 1 | | Unlock | |
| 5 | 0 | | | Read/write lock |
| 6 | −1 | Read/write lock | Read-only lock | Read/write data |
| 7 | −1 | | | Unlock |
| 8 | 0 | Read/write lock | Read-only lock | |
| 9 | −1 | Read/write data | | |
| 10 | −1 | Unlock | | |
| 11 | 0 | | Read-only lock | |
| 12 | 1 | | Read data | |
| 13 | 1 | | Unlock | |
| 14 | 0 | | | |

At sequence 1, a request from IPU102 is received at the L2 cache requesting a read-only lock to the address A of the L2 cache. The request is accepted because the lock-variable of the address A is zero at the cycle. IPU102 may be put to sleep after supplying the request.

At sequence 2, the L2 cache adds one to the lock-variable for the request from IPU 102 and reads the shared data from the address A for IPU 102. The lock-variable is now one indicating that there is one read-only lock request, which is pending in address A of the L2 cache. Simultaneously, two requests from IPU 104 and IPU 106 are received respectively requesting a read-only lock and a read/write lock to the address A. Among the two requests, only the request from IPU 104 (i.e., a read-only lock) is accepted either because IPU 104 has a higher priority than IPU 106 or a read/write lock request cannot be accepted with the positive value of the lock-variable (i.e., 1). IPU 106 may wait (i.e., sleep) until the address A is released and try again by issuing a new sleep-lock request upon waking up.

At sequence 3, the L2 cache adds one to the lock-variable for IPU 104 and reads the shared data for IPU 104. The lock-variable is now two indicating that two read-only lock requests are currently pending in address A of the L2 cache. The read-only lock for IPU 102 is completed at sequence 3.

At sequence 4, the L2 cache subtracts one from the lock-variable indicating that the request from IPU 102 is completed. The lock-variable is now one indicating that only one read-only lock request is currently pending at the address A of the L2 cache. The read-only lock for IPU 104 is completed at sequence 4. The L2 cache may broadcast signals using a dedicated return path to the sleeping IPUs (e.g., IPU 106) to inform that address A is unlocked.

At sequence 5, the L2 cache subtracts one from the lock-variable indicating that the request from IPU 104 is completed. The lock-variable is now zero indicating that there is no pending request for the address A. Simultaneously, a read/write lock request is received from IPU 106 and accepted because the lock-variable is zero.

At sequence 6, the L2 cache set the lock-variable to −1 indicating that the address is now locked by a read/write lock request. The L2 cache reads/writes the shared data at the address A. Simultaneously, a read/write lock request from IPU102 and a read-only request from IPU 104 are received, but these requests are not accepted because the address A is now locked by a read/write lock request. IPU 102 and IPU

104 may wait (i.e., sleep) until the address A is released and try again by issuing a new sleep-lock request upon waking.

At sequence 7, the read/write lock request from IPU 106 is completed. The L2 cache may broadcast signals using a dedicated return path to the sleeping IPUs (e.g., IPU 102 and IPU2 104) to inform that address A is unlocked.

At sequence 8, the L2 cache sets the lock-variable back to zero because the read/write lock request is completed at sequence 7. Simultaneously, a read/write lock request from IPU 102 and a read-only request from IPU 104 are received at sequence 8. Among the two requests, the read/write lock request from IPU 102 is accepted because IPU 102 has a higher priority than IPU 104. IPU 104 may wait (i.e., sleep) until the address A is released and try again by issuing a new sleep-lock request upon waking.

At sequence 9, the L2 cache sets the lock-variable to −1 for the read/write request from IPU 102 and reads/writes data from address A of the L2 cache.

At sequence 10, the read/write lock request from IPU 102 is completed. The L2 cache may broadcast signals using a dedicated return path to the sleeping IPUs (e.g., IPU 104) to inform that address A is unlocked.

At sequence 11, the L2 cache sets the lock-variable back to zero because the read/write lock request is completed at sequence 10. Simultaneously, a read-only lock request from IPU 104 is received and accepted.

At sequence 12, the L2 cache adds one to the lock-variable and reads shared data from address A for IPU 104.

At sequence 13, the read-only lock request from IPU 104 is completed. The L2 cache may broadcast signals using a dedicated return path to sleeping IPUs, if any, to inform that address A is unlocked.

At sequence 14, the L2 cache subtracts one from the lock-variable indicating that the read-only request from IPU 104 is completed. The lock-variable is now zero indicating that address A is unlocked.

As described above, a sleep-lock operation at L2 cache 112 allows multiple requesting processing resources (e.g., IPUs) to share data effectively in 'critical regions' of application programs. That is, requesting IPUs may sleep if another requesting IPU has the sleep-lock. The sleeping IPUs may wake upon receiving signals from the L2 cache informing that the specific address that the requesting IPUs want to access is unlocked. The sleep-lock operation may be good for relatively short (i.e., a low level) and/or critical regions of application programs. For long (i.e., a high level) critical regions, instead of using the sleep-lock as described above, an alternative process may be used. For example, if another requesting IPU has a semaphore, rescheduling of processing tasks is performed by the operating system and another rescheduling is performed upon release of the semaphore. The sequences of the lock-variable for the rescheduling is similar to the sequences of the sleep-lock.

Cache Coherence

As the requesting IPUs perform either the sleep-lock operation or the semaphore operation, the values between the internal caches and the external cache may be different because the internal caches tend to be updated by the requesting IPUs, i.e., the caches are incoherent.

Figure 16:
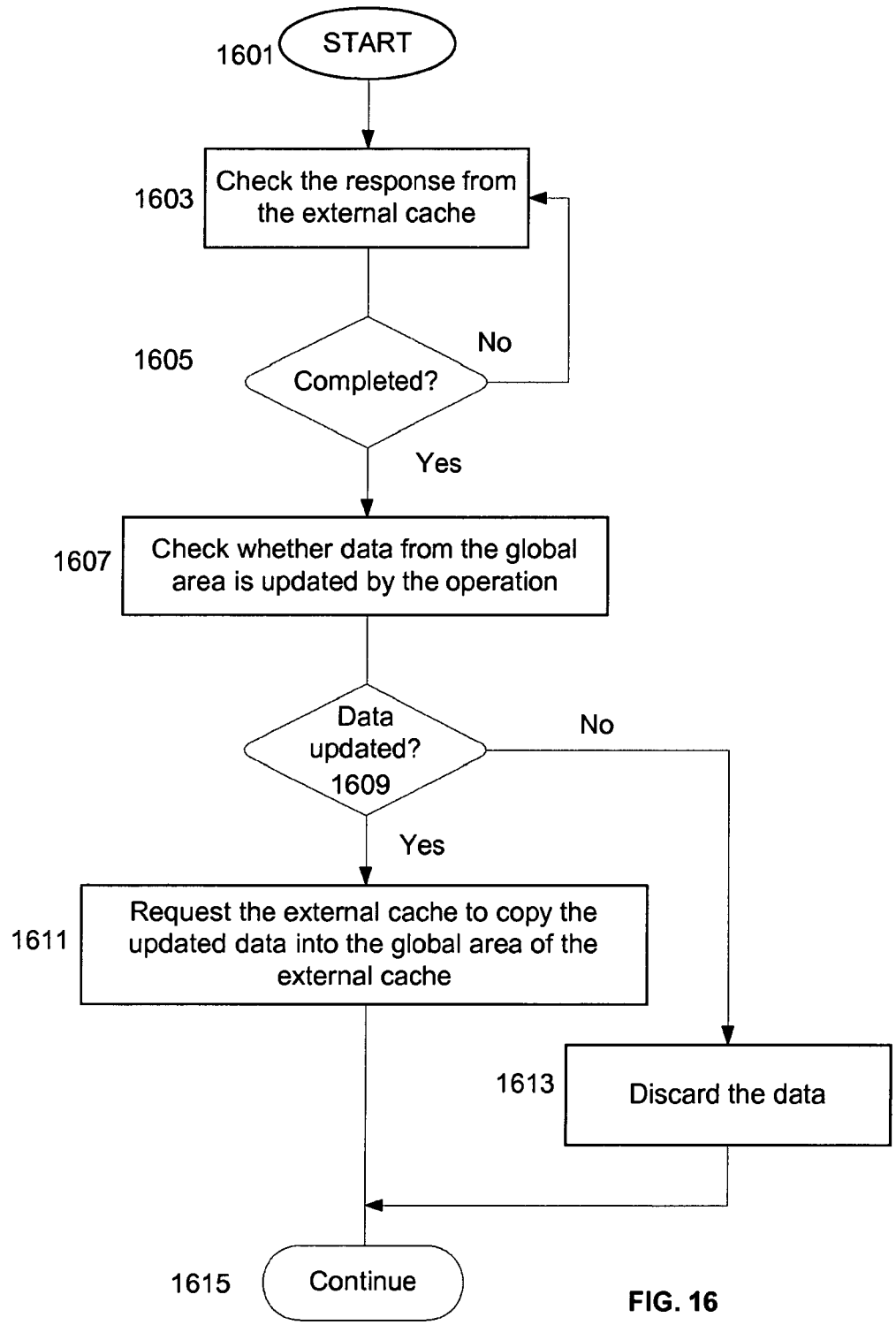
FIG. 16 is of a flow diagram illustrating one, non-limiting example, inventive aspect of the present disclosure of maintaining the cache coherence between the internal caches and the external cache of a processor.

FIG. 16 is of a flow diagram illustrating one, non-limiting example, inventive aspect of the present disclosure of maintaining the cache coherence between the internal caches (e.g., L1 caches 103, 105, 107, 109) and the external cache (e.g., L2 cache 112).

An IPU that performs either a sleep-lock operation or a semaphore operation checks the responses from the external cache 1603 and it is determined whether the operation (i.e., a sleep-lock or semaphore operation) is completed 1605. If it is determined that the operation is not completed, the IPU keeps checking until the operation is completed 1603. If it is determined that the operation is completed, the IPU checks the global area of its internal cache 1607. A determination is then made whether data in the global area of the internal cache is updated by the operation 1609. If it is determined that the data is updated, the IPU requests the external cache to copy the updated data into the external cache's global area 1611. As a result of the copy at the end of the operation, it is guaranteed that a next requesting IPU will access updated data, not old data. If it is determined that the data is not updated 1709, the data are simply discarded by the IPU 1613.

Optimizing Cache

Figure 17:
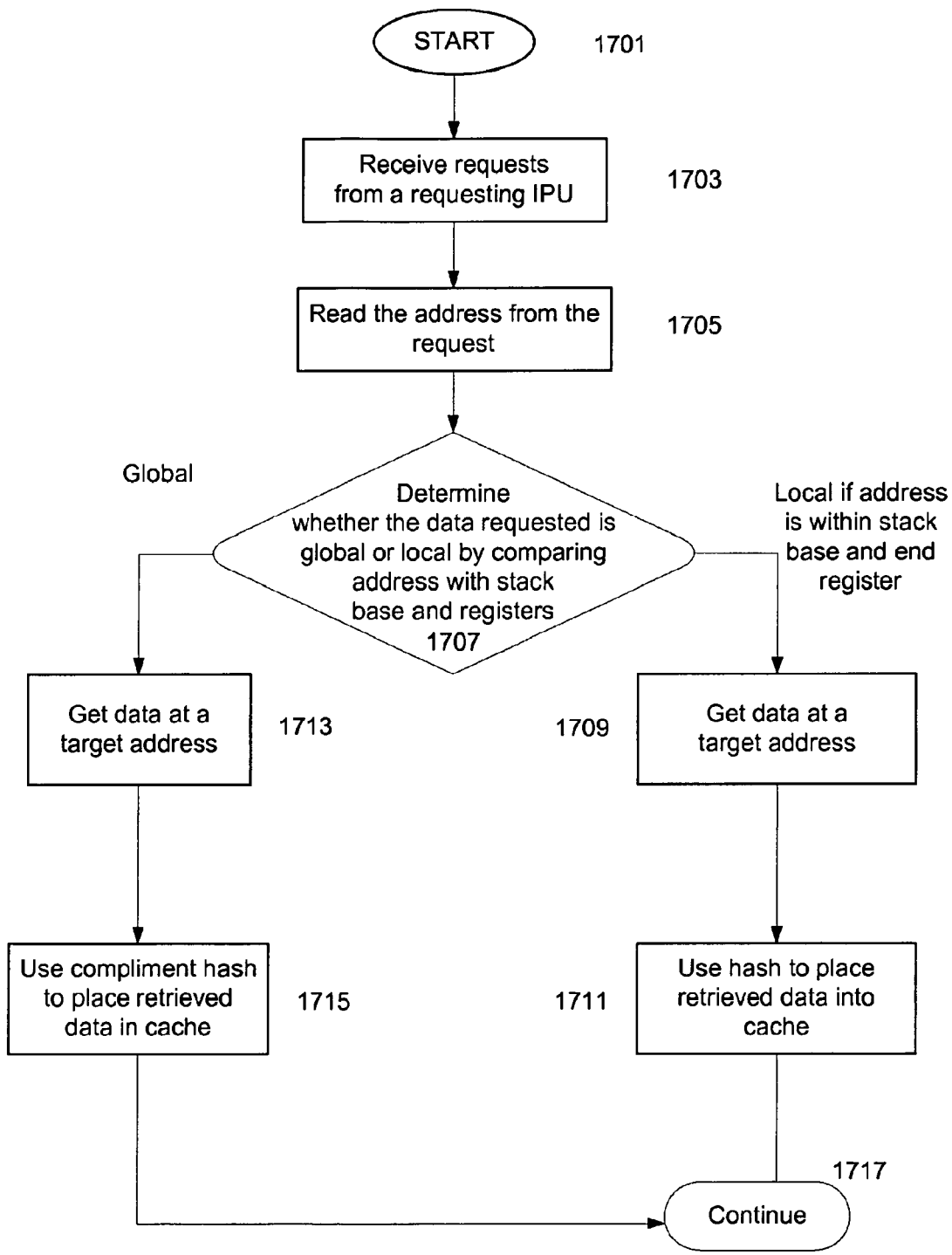
FIG. 17 is of a flow diagram illustrating one, non-limiting example, inventive aspect of the present disclosure of a data optimizing cache facility between the internal and external caches of a processor, FIGS. 18(a).about.(e) are of functional block diagrams illustrating non-limiting example, inventive aspects of the present disclosure providing a format of instructions designed for a processor.

FIG. 17 is of a flow diagram illustrating one, non-limiting example, inventive aspect of the present disclosure of a data optimizing cache facility in L1 caches 103, 105, 107, 109 and L2 cache 112 of Processor 100.

While the basic concept of the data optimizing in the caches is similar throughout the caches, the exemplary method assumes that the optimizing process is performed in the L2 cache, which is external to the IPUs. The L2 cache may be presented with a request from a requesting IPU 1703. The request may be in a similar form constructed by the requesting IPU as shown in FIG. 11. The L2 cache reads the request to get an address that the requesting IPU wishes to access and happens to be available in the L2 cache 1705. The data optimizing cache may include logic circuitry to make comparisons based on targeted address. In one non-limiting example embodiment, the data optimizing cache compares the target address with address values representing a stack address base and end point, which may be maintained in base and end registers, and allocated by, for example, the operating system (e.g., Linux). The address range may be maintained in the base and end registers of the L2 cache. The data optimizing cache then determines whether the data requested is global or local 1707.

If the target address value falls within the values held in the base and end registers, values from the target address will then be deemed local. When a target address is deemed local, the data optimizing cache will get data at the target address 1709. Subsequently, as the data from the target address is obtained, the data optimizing cache may use a hash function to place retrieved data into a "local" segment of the cache 1711.

If the data optimizing cache finds that the target address is not within address values of the base and end of a stack 1707, the target address is deemed to be global. The data optimizing cache then get data at the target address from the L2 cache or memory 1713. The L2 cache then may use, for example, a hash compliment to place the retrieved data from the target address into a global region of the optimizing cache 1715. Upon placing a retrieved value into an appropriate region of the cache 1711, 1715, the cache may continue processing 1717.

As such, in this example embodiment, the hash function determines where in the data optimizing cache a retrieved value is to be stored and the retrieved value will be placed either in a local or a global region of the data optimizing cache based on the address. As such, the comparison between the targeted address and predetermined address range determines whether the target address is local or global, and the hash function further determines where in a cache a value is to be stored (i.e., a local or global region). It should be noted that based on the hash function, data may be categorized and saved in specified and desired portions and allotments of the cache memory. In one example, a hash function may be used to divide the available cache memory equally between local and global values. For example, if local, the highest hash bit will be 1, and otherwise 0 for global.

In an alternative embodiment, a hash function may be used to provide more memory space within the data optimizing cache for local values than global values. By providing more memory within the data optimizing cache to local values, a greater hit rate may be achieved by the cache as programs tend to cycle with locality of reference. It should be noted that the hash function may be altered and used to provide optimization based on various data processing needs. For example, a hash function may be used to partition the memory space of a data optimizing cache into three segments global instruction, global data and local data. In yet another alternative example embodiment, a hash function may be provided to partition the memory space of data optimizing cache into four regions including global instructions, global data, local instructions, and local data. It should be noted that the hash function of the data optimizing cache may be altered to provide numerous and limitless data and category regions based on particular processing needs.

Instruction Set Architecture

FIGS. 18(a).about.(e) are of functional block diagrams illustrating non-limiting example, inventive aspects of the present disclosure providing a format of instructions designed for Processor 100. A 16-bit fixed size instruction set is designed for Processor 100 of the present invention as an embodiment. Appendix 1 illustrates an exemplary 16 bit instruction set for a 32 bit system architecture. Appendix 2 illustrates an exemplary 16 bit instructions set for a 64 bit system architecture.

FIG. 18(a) is a literal prefixed instruction with a 12-bit literal prefix, FIG. 18(b) is an optionally prefixed instruction with a 5-bit literal prefix, FIG. 18(c) is an optionally prefixed instruction with an 8-bit literal prefix, FIG. 18(d) is an always prefixed instruction with an 8-bit literal prefix, and FIG. 18(e) is a never prefixed instruction with no literal prefix, respectively. Using the instruction set, small literal constants may be embedded in an instruction, and the size of the literal constant may be extended with the literal prefix instruction, each of which extends a literal by 12 bits in this embodiment. Alternatively, a different number of bits for a literal constant and literal prefix may be employed depending on deployment requirements. This instruction set structure allows for optimization in processor operation and caching as will be seen throughout the disclosure.

Literal prefix and literal constant functionality allows for instruction operand reduction and instruction extension. Such instruction size reduction allows for eased and more efficient cache coherency maintenance by resulting in 16-bit opcodes. Generally, many instructions offered by the present invention may be preceded by the literal prefix instruction (LPX) (e.g., FIG. 18(a)) with 12 extra literal bits, which serve to extend the literal data or address ranges of the instructions. For example, it is possible to generate 32 bit value of data or address with an instruction with 8 bit literals (e.g., FIG. 18(c)) by concatenating the two 12 literal bits from two LPX instructions before the instruction with 8 bit literals on which they are to act. As further examples, the optionally prefixed instruction with 5-bit literal with two LPX instructions will give 29 bits of literal (i.e., 5 bit+2.times.12 bits) and instructions with an address literal (i.e., FIG. 18(d)) are always prefixed by one or two LPX instructions, which extend the address literal to 20 (i.e., 8+12) or 32 (8+2.times.12) bits. The literal prefix is an instruction in its own right, and executed in the IPU pipeline like any other instructions. In the operation, the IPU and the literal prefix instructions may be configured in such a way that one or more literal prefix instructions (i.e., FIG. 18(a)), upon being fetched into the instruction registers of the IPUs, sets the flag of a status register implying that an optionally and/or always prefix instruction (i.e., FIGS. 18(b).about.(d)) or another literal prefix instruction will be followed. The optionally and/or always prefixed instruction, upon being fetched into the appropriate registers by the IPUs, clears the prefixed flag set by the literal prefix instructions. The fetched one or more literal prefix instructions and the optionally and/or always prefix instruction may be executed simultaneously. In an embodiment, instructions are fetched by the IPUs in 64 bit words of four instructions expediting the fetching process. As a result, the pipeline of the IPUs may be designed in such a way that an instruction and the literal prefix instructions are simultaneously executed as long as they are within the same 64 bit word. With additional hardware, they may also be simultaneously executed even if they are in adjacent 64 bit words, i.e., not within the same 64 bit word.

Instructions with fixed size 16 bits have been limited to a subset of the instruction set that is required to effectively process all C/C++/Java data types and operations, allowing one instruction to do that which other less focused architectures require a sequence of instructions to perform. This means that the 16 bit instruction size architecture leads to short compiled machine code for a given source program. This not only saves on the amount of memory required to store programs, but also leads to faster execution because a 64 bit memory word fetch brings in more instructions at a time. Moreover, by adopting the 16 bit fixed size instruction, the instruction decoding logic is relatively simple and fast, and the instruction execution pipeline is also short, simple and fast. This simultaneously leads to high silicon efficiency and high speed execution without the need for using expensive techniques such as long pipelines which have a high stall cycle penalty on every program branch, instruction reordering and speculative execution which uses a lot of silicon area and slows execution down by almost as much as it gains, and/or a branch prediction which also uses a lot of silicon area and is needed for long pipelines but not short pipelines. However, despite obviously being a good idea, to fit every required data type and operation in a 16 bit fixed size instruction set has been difficult for designers.

To fit every required data type and operation within a 16 bit fixed size instruction, the following three methods have been developed and used in the present invention.

(1) Literal Prefix as a 17th Bit of the 16 Bit Instructions

There exist three types of instructions in the present invention, i.e., instructions that are optionally literal prefixed (e.g., FIGS. 18(b), 18(c)), instructions that are always literal prefixed (e.g., FIG. 18(d)), and instructions that are never literal prefixed (e.g., FIG. 18(e)). Where two instructions co-exist, one of which always requires a literal prefix and the other forbids it, they may share the same instruction opcode without ambiguity. This extends the opcode space of the instructions and thereby increases the number of instructions that can be encoded in the 16 bit instruction format The presence of a literal prefix is indicated by a flag bit in the IPUs' status register, which effectively acts as a 17th opcode bit of the 16 bit instructions making each processor essentially a 17 bit instruction size.

(2) Reduced Bits to Represent Registers

Each of IPUs 102, 104, 106, 108 of Processor 100 includes sixteen registers each with thirty-two bits in an embodiment. The registers have been classified into two different types, i.e., 8.times.32 bit data registers and 8.times.32 bit address registers. It is configured so that only three bits of a 16 bit instruction are required to represent a register of the 16 registers. The rest of one required bits is implied by the opcode of the instruction, i.e., type of register is determined by decoding the opcode of the instruction.

(3) Instructions with Different Number of Opcode

Only the highest frequency instructions have three operand, most other instructions have two operand and some with one operand.

Figure 19:
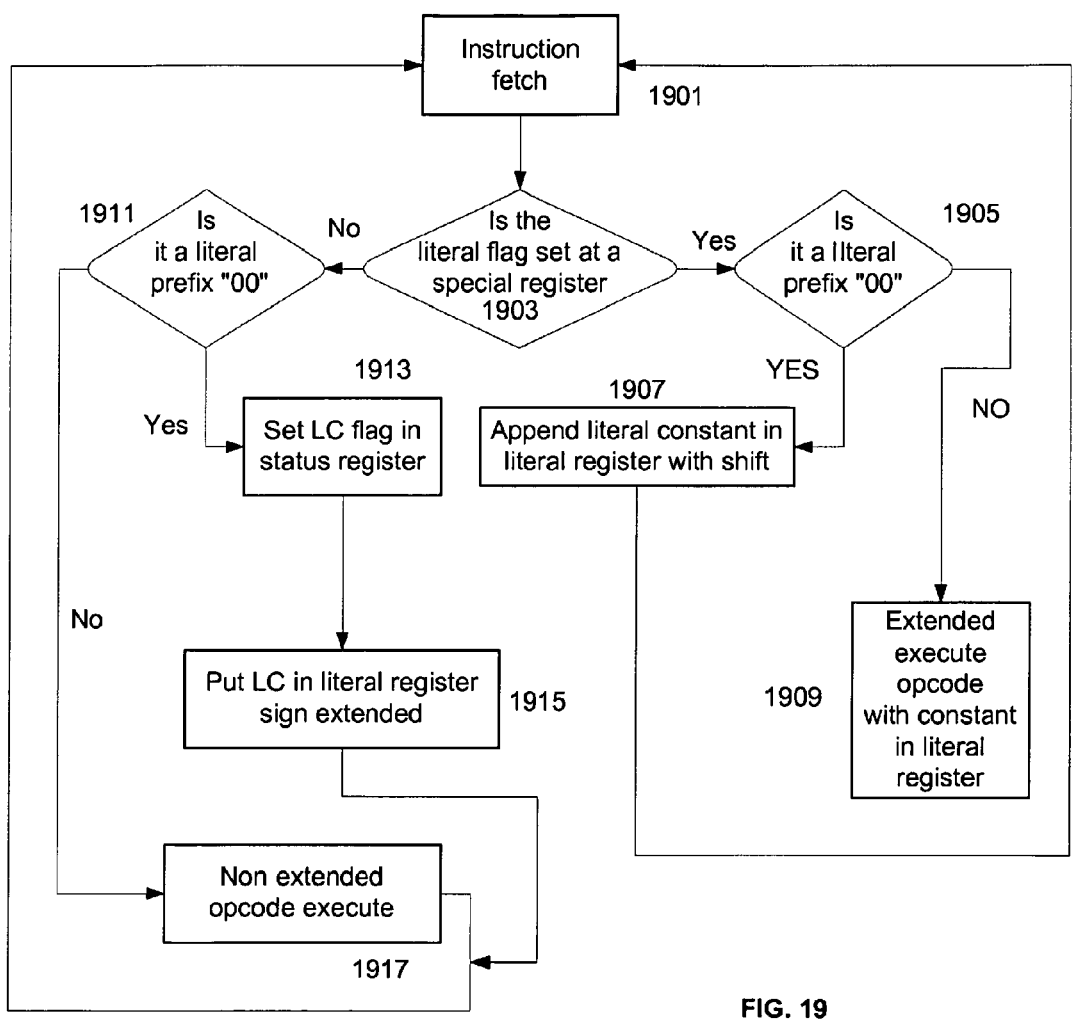
FIG. 19 is of a flow diagram illustrating one, non-limiting example, inventive aspect of the present disclosure of literal prefix and literal constant functionality.

FIG. 19 is of a flow diagram illustrating one, non-limiting example, inventive aspect of the present disclosure of literal prefix and literal constant functionality. At some point, an IPU fetches an instruction 1901. The IPU determines if a literal flag is set by examining a special register 1903. The special register may be in the IPU status register. If the literal flag has been set, then the IPU determines if there is a literal prefix (e.g., 00) 1905. If a literal prefix is present, then the IPU will append in literal constant in the literal register (e.g., by employing a shift) 1907. Upon appending the literal constant, the IPU may continue instruction fetch iteration 1901. If there is no literal prefix in the fetched instruction 1905, the IPU will execute the opcode as an extended operation with a constant in the literal register 1909. Upon extended execution of the opcode, the IPU may continue instruction fetch iteration 1901.

If no literal flag is set 1903, the IPU determines if a literal prefix is present in the fetched instruction 1911. If no literal prefix is supplied, the IPU may execute the opcode in the fetched instruction in a non-extended manner 1917. However, if a literal prefix is provided in the fetched instruction 1911, then the IPU may set a literal constant (LC) flag in a status register 1913. Upon setting the literal constant flag, the IPU may put the literal constant from the literal prefix instruction into the literal register 1915. Upon loading the literal register 1915 or executing the opcode 1917, the IPU may continue instruction fetch iteration 1901.

Context Switch Accelerator

The reduction of operands into 16-bit instructions ensures that such instructions are always bit aligned. As such, it is impossible that an instruction register will ever point to an odd address. Thus, only the last 31 bits in the instruction register are required to address a desired address, which provides an extra bit in the instruction register to be used for other purposes. Thus, a context switch accelerator may be enabled by using the otherwise nugatory 32nd bit in the instruction register. A nugatory bit may be used to determine if Processor 100 is in system mode (e.g., 0) or in user (e.g., 1) mode. By using the 32nd bit for system or user status, Processor 100 is obviated of the need to save status registers or return pointer values as is required in conventional processors. Thus, as the context switch accelerator need only use the instruction register, the requirements to fulfill a context switch are reduced to and become similar to a normal subroutine call. Such context switch acceleration is made possible because Processor 100 no longer needs to flush and store additional registers, yet Processor 100 still properly allows user/system mode access while requiring only one cycle (i.e., the same instruction pointer and jump requirements of a normal subroutine call). Normally, a cycle is required for every register save in a context switch, therefore the context switch accelerator saves cycles by only having to store the instruction register. The prior art employs multiple cycles and uses more memory.

Binding Acceleration

Figure 20:
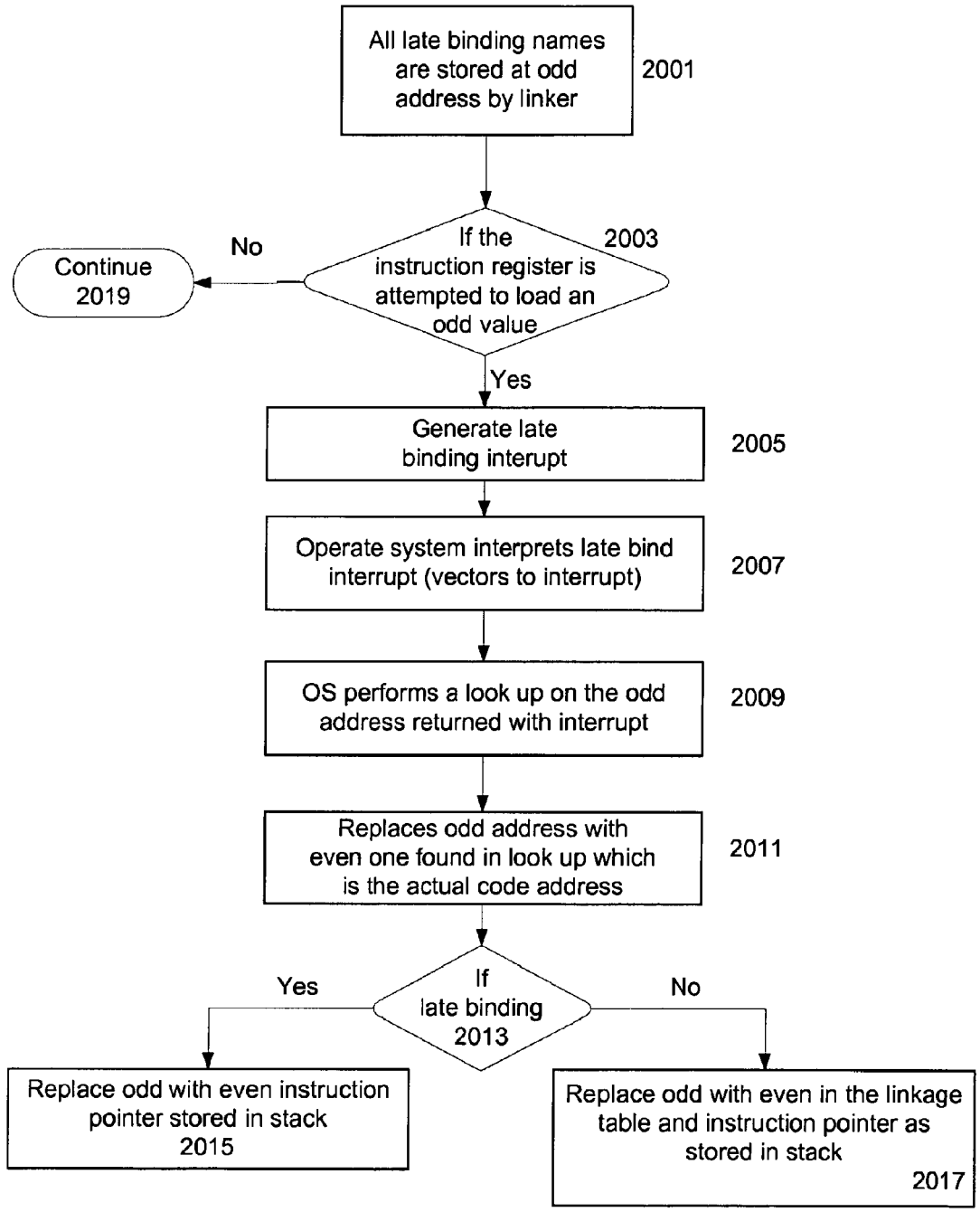
FIG. 20 is of a flow diagram illustrating one, non-limiting example, inventive aspect of the present disclosure providing a late/dynamic binding accelerator.

FIG. 20 is of a flow diagram illustrating one, non-limiting example, inventive aspect of the present disclosure providing a late/dynamic binding accelerator. In one exemplary embodiment, all late/dynamic binding names are stored at an odd address by a linker 2001. This may be achieved by writing a compiler to store such late/dynamic binding names and employ an odd address by simply adding 1 in the 32nd bit to any address for the binding names. As such, if an IPU attempts to load an instruction register with an odd address value 2003, the IPU generates a binding interrupt signal 2005. If the IPU attempts to load the instruction register with an even value 2003, no interrupt is required and processing may continue 2019. Upon generating the interrupt 2005, the operating system may interpret the late/dynamic binding interrupt (i.e., vectoring to interrupt) 2007. Upon interpretation, the operating system performs a look-up on the odd address returned with the interrupt 2009. The late/dynamic binding accelerator then replaces the odd address in the instruction register stored in the stack with an even address found in the look-up of the late/dynamic binding names table that was established by the linker 2011. The even address found in the look-up is the actual address for the code that is to be executed. The late/dynamic binding accelerator then determines if late binding is being used by examining the linkage table entry 2013. If late binding is being employed, then the odd address is replaced with even instruction pointer stored in stack 2015. If dynamic binding is being employed, then the odd address is replaced with an even instruction pointer in the linkage table entry 2017, so that there will be no interrupt on a later access.

Multicycle Instruction Reduction

Status Register Cycle Flags

FIG. 21 is of a table illustrating one, non-limiting example, inventive aspect of the present disclosure of multicycle instruction reduction. The table illustrates that the value of a cycle flag is set depends upon the number of cycles that will be required based on an operation. Thus, for the operations that require a simple (e.g., normal) cycle to complete (2109), the operations will result in the cycle flags being set to "0" (2102). Operations requiring two cycles or double processes (2111) such as a load or save operation will set the cycle flags to "1" (2103). Multi-cycle/double processes (e.g., extended) operations (2113) will set the cycle flag to "2" (2105). Repeated operations (2115) such as multi-cycle, single or double process status operations will set the cycle flag to "3" (2107).

Register Address Reduction

Status Register Type Flag

FIG. 22 is of a table illustrating one, non-limiting example, inventive aspect of the present disclosure which provides various IPU registers, which may be accessed based on type flags that are set in a reduced register address portion of an instruction. In one example embodiment of Processor 100 employing 16 registers, only 3 dedicated bits are required to address all 16 registers. Normally, addressing 16 registers would require 4 bits of address. Such register address instruction reduction is made possible by dedicating 3 bits to register addressing. Additional 1 bit come from the interpretation of an operation code, which sets type flags in a status register as shown in the table. Thus, based on the type flag, various register types (e.g., data type (2213) or address type (2215)) may be accessed. In this example embodiment, the registers may hold 32 bits of data 2209, 2211. In alternative embodiments, the registers may be of variable size (e.g., 48 bits, 64 bits, 96 bits, 128 bits, etc.). As 3 bits are dedicated to register addressing, each type of register bank may itself contain up to 8 registers 2205, 2207. Thus, when the type flag in a status register is set to "0" 2201, the 3 bits dedicated to register addresses will access data registers. When the type flag is set to "1" 2203 in combination with the dedicated 3 bits to register addresses, the address registers may be accessed. As such, the type flags being set in a status register in combination with 3 bits dedicated to register addressing allows for access to a total of 16 registers. Such register address bit reduction allows reduced instructions (e.g., an instruction set that may be fit into 16 bits, which increases cache coherency and overall processor efficiency).

Atomic Instructions

Figure 23:
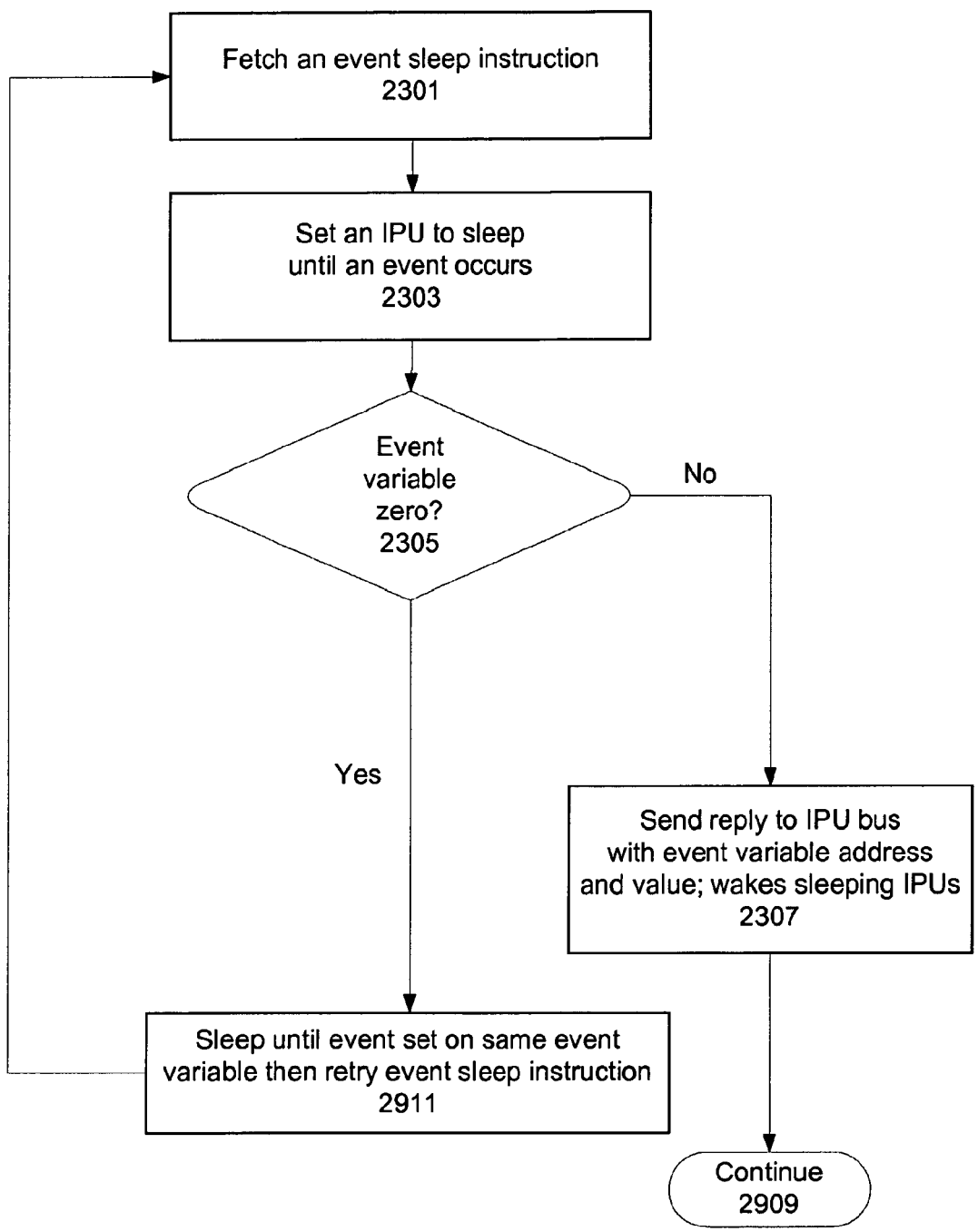
FIG. 23 is of a flow diagram illustrating one, non-limiting example, inventive aspect of the present disclosure providing an event sleep facility.

FIG. 23 is of a flow diagram illustrating one, non-limiting example, inventive aspect of the present disclosure providing an event sleep facility. As some point, an even sleep instruction is fetched 2301 and the instruction is used to set an IPU to sleep until an event occurs 2303. An event sleep instruction is an atomic instruction in a processing cache (e.g., L2 cache 112). The processing cache determines if an event variable stored in the processing cache is set to zero 2305. If the event variable is not zero 2903, then the processing cache sends a reply to an IPU bus with the event variable address, which will wake the appropriate IPU from sleep 2307. If the event variable is equal to zero 2305, then the processing cache will set the IPU to sleep until event variable is set to a nonzero value 2311. Thereafter, the processing cache may retry the event sleep instructions 2301. Upon sending the reply 2307, the processing cache may continue to operate 2309.

Figure 24:
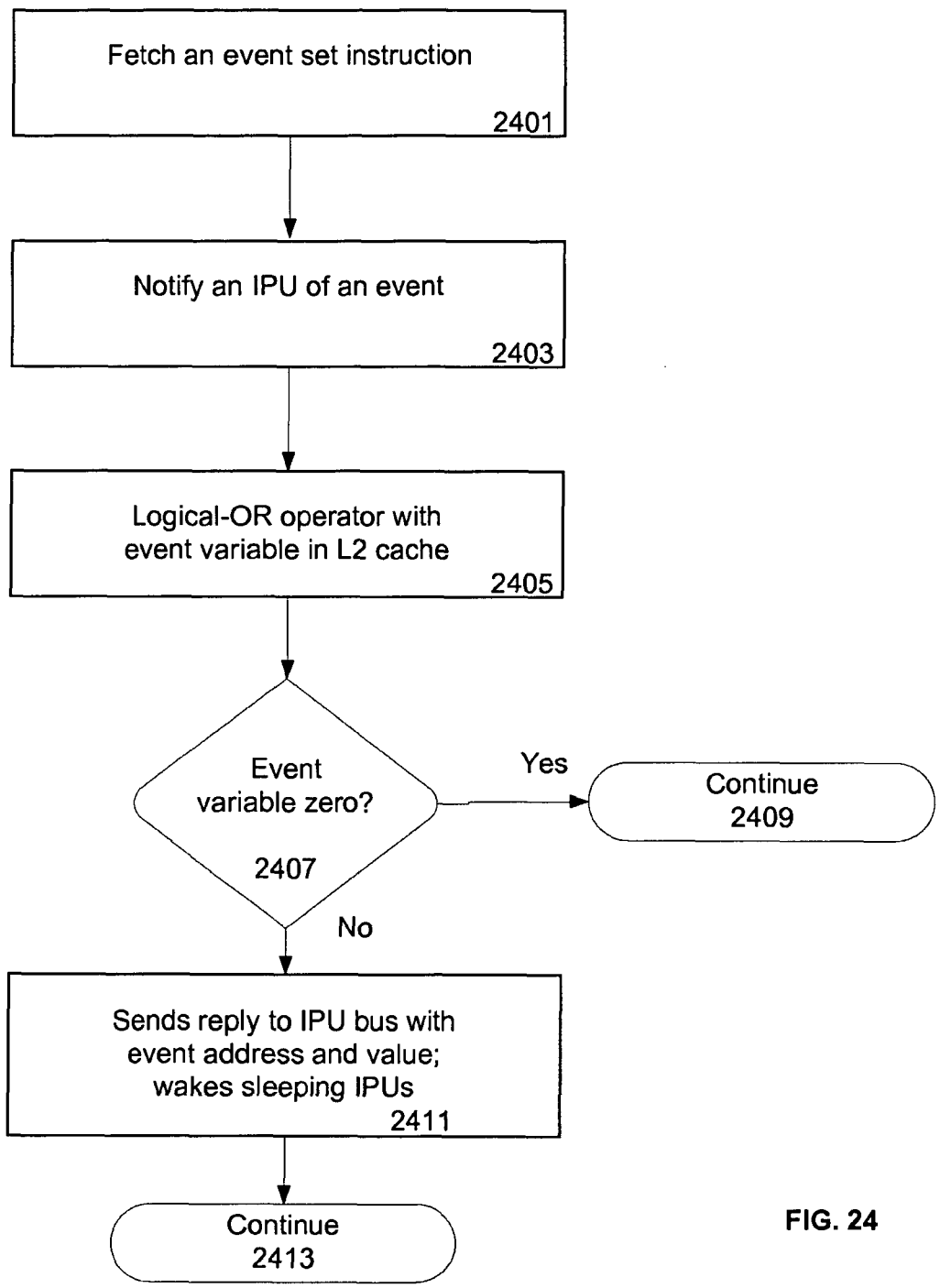
FIG. 24 is of a flow diagram illustrating one, non-limiting example, inventive aspect of the present disclosure providing an event set instruction facility.

FIG. 24 is of a flow diagram illustrating one, non-limiting example, inventive aspect of the present disclosure providing an event set instruction facility. An event set instruction is an atomic operator in a processing cache (e.g., L2 cache 112). At some point, an event set instruction is fetched 2401 and used to notify a processing resource that an event is taking place 2403. A parameter is combined with an event variable through a logical-OR operation in the L2 cache 2405. The parameter is a bit mask and is obtained from the data being written to the L2 cache. If the resulting event variable is equal to zero 2407, then the processing cache will continue to operate 2409. If the resulting event variable is not equal to zero 2407, then the data optimizing cache sends a reply to the IPU bus with the event address and value, which wakes the sleeping IPU that is waiting on the event 2411. Upon sending the reply, the data optimizing cache may continue to operate 2413.

In one exemplary embodiment, each IPU can track up to 32 events, which is limited by the word length of an IPU, and which may operate similarly to interrupts as has already been discussed.

Wait-On-Semaphore

Figure 25:
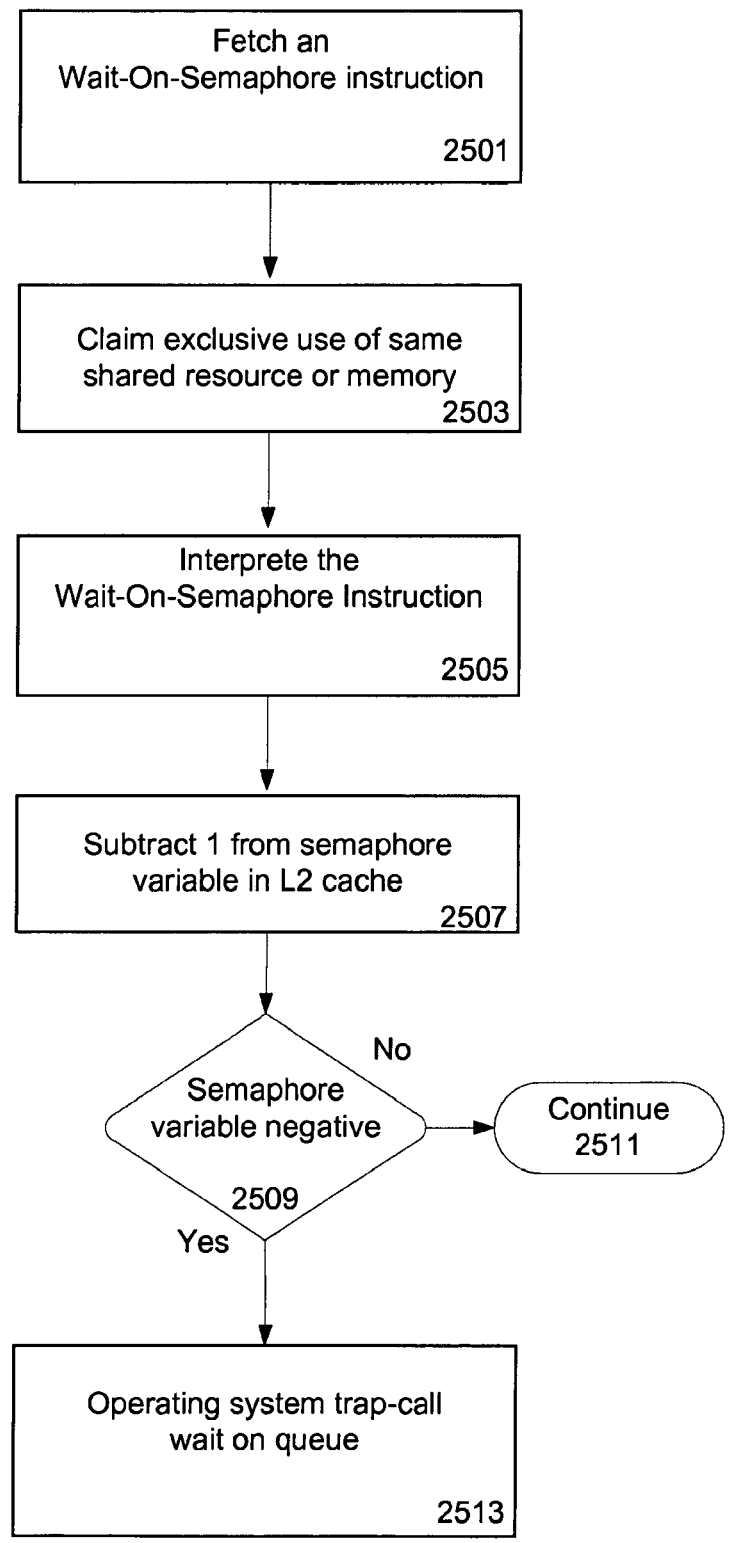
FIG. 25 is of a flow diagram illustrating one, non-limiting example, inventive aspect of the present disclosure providing a wait-on-semaphore instruction facility.

FIG. 25 is of a flow diagram illustrating one, non-limiting example, inventive aspect of the present disclosure providing a wait-on-semaphore instruction facility. A wait-on-semaphore instruction is an atomic operation for a processing cache (e.g., L2 cache 112). At some point, a wait-on-semaphore instruction is fetched 2501 and used to claim exclusive use of some shared resource or memory 2503. Upon interpreting a wait-on-semaphore instruction operation 2505, the data optimizing cache will subtract "1" from a semaphore variable in the L2 cache 2507. If the processing cache determines that the semaphore variable is negative 2509, an operating system trap-call to wait on the queue is issued 2513. This trap-call causes rescheduling so that other program threads/processes may wait for execution of a thread to release its semaphore on a particular DU. If the semaphore variable is not negative 2509, the processing cache may continue to operate 2511.

Signal-On-Semaphore

Figure 26:
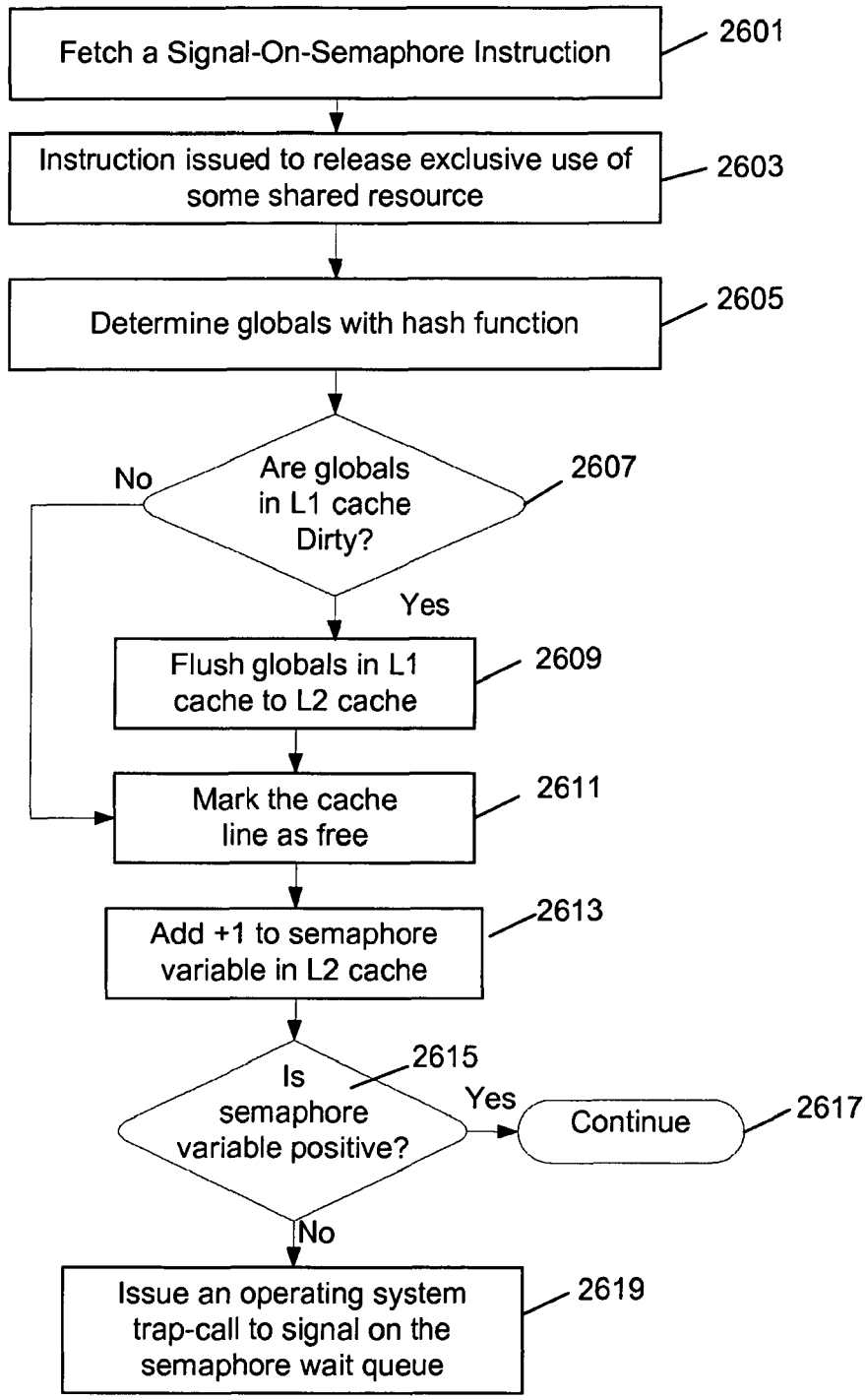
FIG. 26 is of a flow diagram illustrating one, non-limiting example, inventive aspect of the present disclosure providing a signal-on-semaphore instruction facility.

FIG. 26 is of a flow diagram illustrating one, non-limiting example, inventive aspect of the present disclosure providing a signal-on-semaphore instruction facility. A signal-on-semaphore instruction is an atomic operation of a processing cache (e.g., L2 cache 112). At some point, a signal-on-semaphore instruction is fetched 2601 and used to release some shared resource or memory from exclusive use 2603 (e.g., the signal-on-semaphore instruction is used to signal that a processing resource is no longer being used). In order to synchronize the L1 caches of IPUs 102, 104, 106, 108 and L2 cache 112 prior to the semaphore operation, the global data in the L1 caches may be checked with a hash function 2605. Subsequently, it is determined whether the global data in the L1 caches are dirty (i.e., updated during an exclusive operation) 2607. If the global data are dirty, they are flushed to the L2 cache by writing all dirty L1 cache global data to the L2 cache 2609 and marking all L1 cache global data entries empty 2611. If the global data are not dirty 2607, then operation at 2609 is skipped. The processing cache then adds "1" to a semaphore variable in the L2 cache 2613. Subsequently, it is determined whether the semaphore variable is positive 2615. If a semaphore value is positive, then the data optimizing cache will continue to operate 2617. If the semaphore variable in the L2 cache is not positive 2615, an operating system trap-call is issued to signal on the semaphore wait queue 2619). Such an operating system trap signal has the effect of rescheduling so that the IPU may execute other programs/threads/processes.

Sleep Lock Instruction

Figure 27:
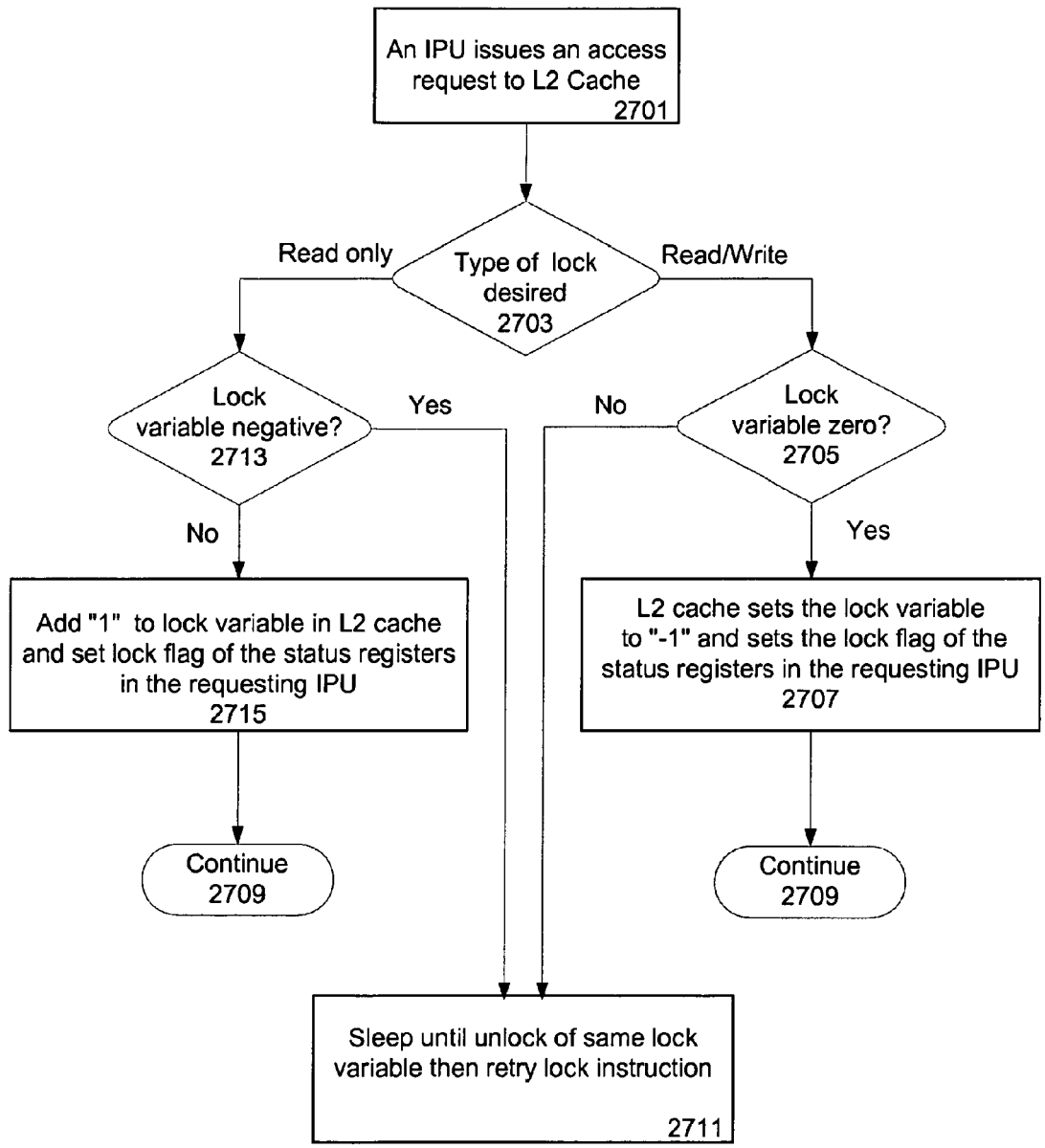
FIG. 27 is of a flow diagram illustrating one, non-limiting example, inventive aspect of the present disclosure providing a sleep lock instruction facility.

FIG. 27 is of a flow diagram illustrating one, non-limiting example, inventive aspect of the present disclosure providing a sleep lock instruction facility. A sleep lock instruction is an atomic L2 cache operation. At some point, a requesting IPU (e.g., IPU 102) issues an access request to shared memory variables in the processing cache (i.e., L2 cache 112) 2701. The L2 cache determines the type of lock desired based on the access request 2703. If the desired lock type is a read/write operation, the L2 cache then determines if the lock variable is "0" (i.e., unlocked) 2705. If the lock variable is zero, then the L2 cache sets the lock variable to "4", and further sets the lock flag of the status register in the requesting IPU 2707. Upon setting the lock variable, the L2 cache continues to process 2709. If the lock variable is not "0" 2705 (e.g., "−1"), then the L2 cache will instruct the requesting IPU to sleep until an unlock is performed with the same lock variable and then retry the lock instruction 2711. If the desired type of lock is a read-only lock 2703, then the L2 cache will determine if the lock variable is negative 2713. If the lock variable is negative, then the L2 cache will instruct the IPU to sleep until it is unlocked with the same lock variable and then retry the lock instruction 2711. If the lock variable is not negative 2713, then the L2 cache adds "1" to the lock variable of the L2 cache and sets the lock flag of the status register in the requesting IPU 2715. Upon adding to the lock variable, the L2 cache may continue to operate 2709.

Sleep Unlock Instruction

Figure 28:
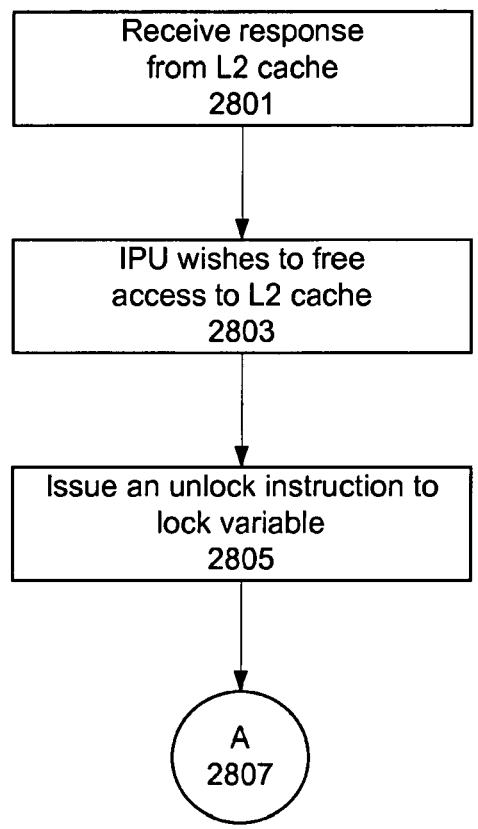
FIG. 28 is of a flow diagram illustrating one, non-limiting example, inventive aspect of the present disclosure providing an unlock operation.

FIG. 28 is of a flow diagram illustrating one, non-limiting example, inventive aspect of the present disclosure providing an unlock operation. As has already been discussed, an IPU may receive a response from the data processing cache (i.e., L2 cache 112) 2801. The IPU upon receiving the response determines whether it wishes to free access to an area of the L2 cache 2803. The IPU then issues an unlock instruction directed at the lock variable of the target address in the received response 2805, which will be further discussed in FIG. 29.

Figure 29:
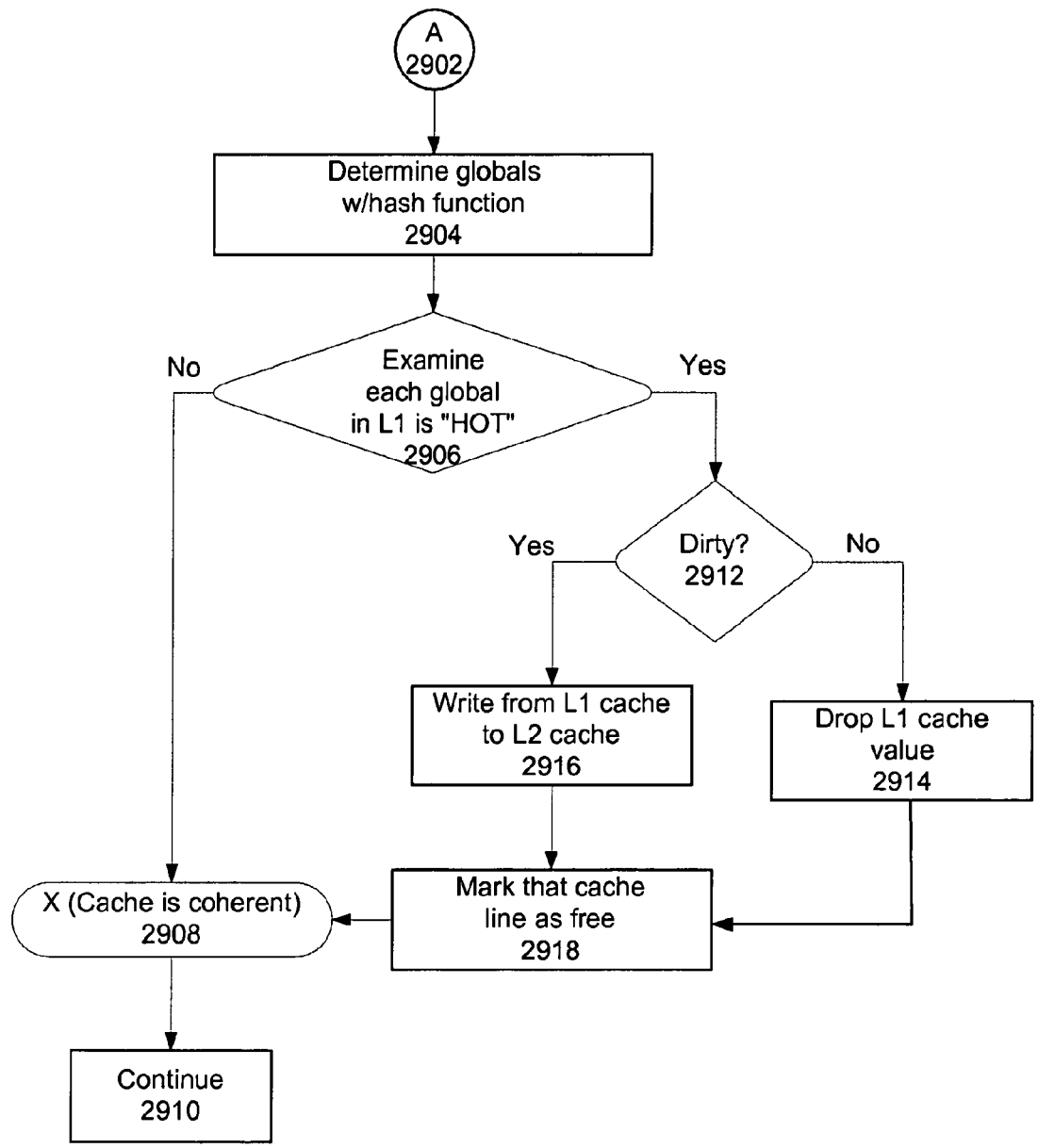
FIG. 29 continues to illustrate the unlock operation from FIG. 28.

FIG. 29 continues to illustrate the unlock operation from FIG. 28 2902. The IPU determines value types (e.g., global or local) by using, for example, a hash function 2904. The IPU then determines if each global value in the L1 data cache is hot or not 2906. A hot global value is one that has been loaded to the L1 cache (e.g., L1 cache 103) while the lock was set. If the global value in the L1 cache is not hot 2906, a coherence check is performed 2908 as is further discussed in FIG. 30. If a global value in the L1 cache is hot 2906, the IPU then determines if that value is dirty 2912. A dirty value is one where the value in the L1 cache has not been updated to the L2 cache. If the global value in L1 is not dirty 2912, the value in the L1 cache is dropped 2914 without requiring the IPU to do any further work and execution may continue 2910. If the global value in the L1 cache is dirty 2912, the global value is written out from the L1 cache to the L2 cache 2916. After writing from the L 1 to the L2 cache, the cached address is then marked as being free 2918. Thus, upon ensuring that the cache is coherent 2914, 2918, processing may continue 2910.

Figure 30:
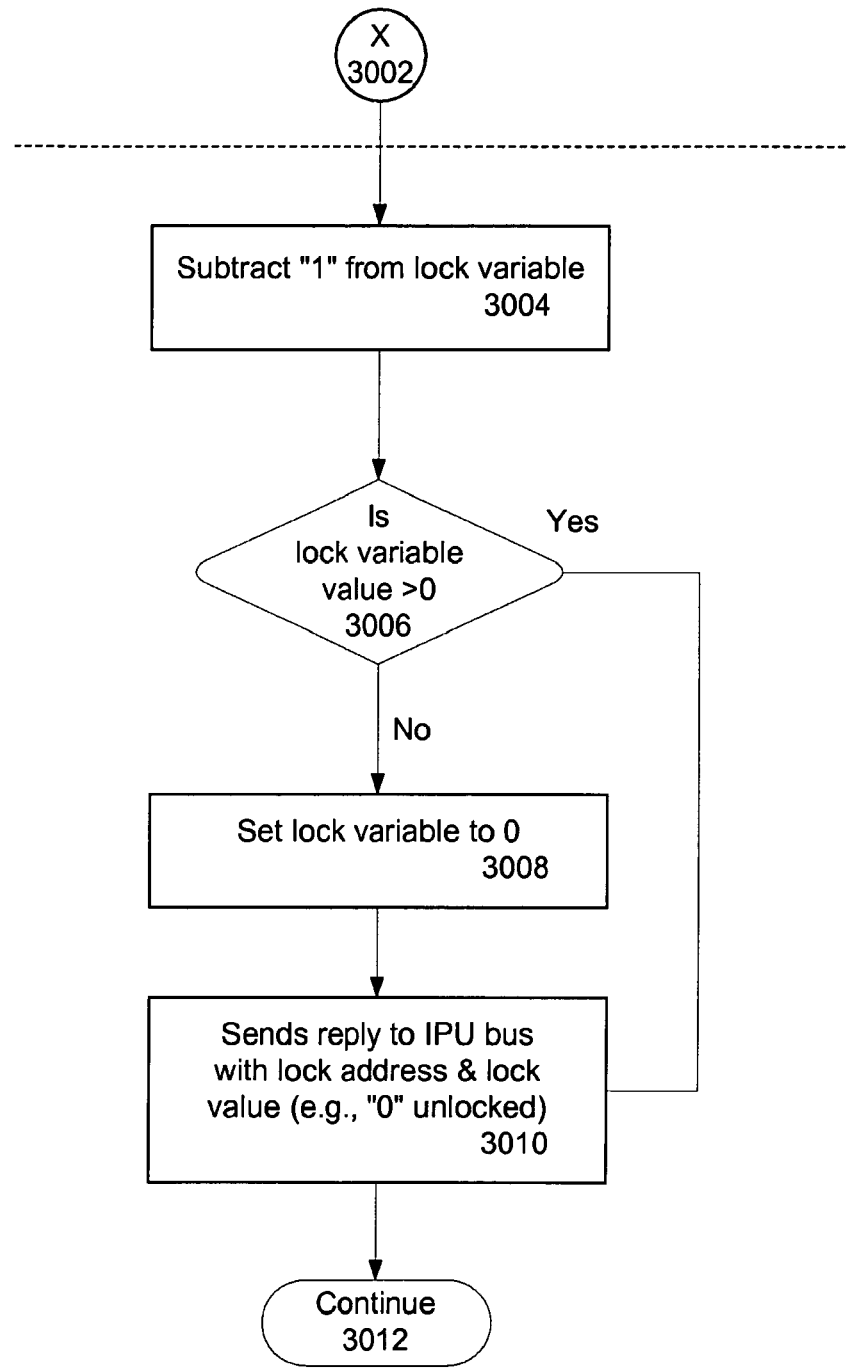
FIG. 30 continues to illustrate an unlock operation in ensuring the cache coherence of FIG. 29.

FIG. 30 continues to illustrate an unlock operation in ensuring the cache coherence 2908 of FIG. 29 3002. To ensure the cache coherence, "1" is subtracted from the locked variable of the target address in the L2 cache 3004. Subsequently, a determination is made if the target address is still locked by checking the lock variable of the target address (e.g., if the target address lock variable is greater than zero, it is still locked) 3006. If the lock value is still greater than zero, the target address and the lock value of the target address are sent as a reply to the IPU bus 3010. In the case where the lock value is greater than zero 3006, multiple processing resources, e.g., IPUs, may be reading/accessing the target address, and as such the remaining reading resources are informed and allowed to continue accessing the target address while a read-only lock is maintained. If the lock variable of the target address is less than or equal to zero 3006, the lock variable is set to zero 3008 to tidy up. Upon setting the lock variable to zero (i.e., unlocking the target address), the L2 cache sends the target address and the lock value along the IPU bus to inform the IPUs 3010. Upon providing the target address and lock value, processing may continue 3012.

Other atomic instructions in the L2 cache include the ability to add a parameter to a value in the L2 cache, to perform a logical-OR of a parameter to a value in the L2 cache, to perform a logical-AND to a parameter to a value in the L2 cache, and to perform a logical-NOT to a parameter to a value in the L2 cache. All of the above-noted atomic instructions of the L2 cache may be accessed from C macros and/or other higher language functions. It should be noted that the decoding of an opcode may cause delegation of operations to the L2 cache from an IPU or some other processing resource. It should be further noted that the L2 cache instruction set is but one example set, and that numerous and varied alternative embodiments may be employed.

It should be understood that the above description is only representative of illustrative embodiments. For the convenience of the reader, the above descriptions have focused on a representative sample of various possible embodiments, a sample that teaches the principles of the invention. The description has not attempted to exhaustively enumerate all possible variations. That alternate embodiments may not have been presented for a specific portion of the invention or that further undescribed alternate embodiments may be available for a portion is not to be considered a disclaimer or abandonment of those alternate embodiments. It will be appreciated that many of those undescribed embodiments incorporate the same principles of the invention and others are equivalent. Thus, it is to be understood that the embodiments and variations shown and described herein are merely illustrative of the principles of this invention and that various modifications may be implemented without departing from the scope and spirit of the invention.

In addition, the disclosure herein includes other inventions not presently claimed. Applicant reserves all rights in those presently unclaimed inventions including the right to claim such inventions, file additional applications, continuations, continuations in part, divisions, and/or the like thereof.

What is claimed is:

1. A method of execution-instruction delegation among multiple elemental processing resources of at least two different types, the multiple elemental processing resources comprising two or more elemental processing resources of a first type each sharing two or more elemental processing resources of a pipelined computational type with at least one other of the two or more processing resources of the first type, the processing resources of the first type each being configured to receive a non-delegated program instruction from a thread in memory that it can execute, or delegate for execution by one computational type elemental processing resource, the processing resources of the computational type each being coupled to the at least two elemental processing resources of the first type so as to be shared, and only receive and execute instructions that were delegated to their pipeline for execution, by the at least two processing resources of the first type, the method comprising:

obtaining an execution instruction from the thread, wherein the execution instruction is obtained at one of the elemental processing resources of the first type;

determining whether an operation-code within the execution instruction is incapable of being executed by the one elemental processing resource of the first type and thus should be delegated to one elemental processing resource of the computational type that the one elemental processing resource of the first type shares in common with another elemental processing resource of the first type;

executing the execution instruction with the one elemental processing resource of the first type, if the operation-code within the execution instruction should not be delegated to any elemental processing resource of the computational type;

if the execution instruction should be delegated, providing a specific elemental processing resource of the first type access to a specific computational type elemental processing resource it shares with another of the elemental processing resources of the first type based upon an arbitration request by the specific elemental processing resource of the first type; and routing the execution instruction and an identifier for the specific elemental processing resource of the first type that delegated the execution instruction to a pipeline of the specific elemental processing resource of the computational type that is shared in common and is capable of executing the operation code;

following a delegation, causing the specific elemental processing resource of the first type that delegated the execution instruction to sleep while awaiting a broadcast, on a shared bus, of the identifier and a result of execution of the operation code, unless the specific elemental processing resource of the first type can execute or delegate a next operation code in the thread; and when the specific elemental processing resource of the first type sleeps, the specific elemental processing resource of the first type that delegated the execution instruction will wake when the identifier is recognized on the shared bus so that it can receive the result and continue processing the thread.

2. The method of claim 1, wherein the method is completed within a single processing cycle.

3. The method of claim 1, wherein the operation-code indicates a type of resource on which to execute.

4. The method of claim 1, wherein one or more of the elemental processing resources of the first type is an integer processing unit.

5. The method of claim 1, wherein one or more of the elemental processing resources of the computational type is a mathematical processing unit.

6. The method of claim 1, wherein one or more of the elemental processing resources of the computational type is a vector processing unit.

7. The method of claim 1, wherein one or more of the elemental processing resources of the computational type is a graphics processing unit.

8. The method of claim 1, wherein one or more of the elemental processing resources of the computational type is a digital signal processing unit.

9. The method of claim 1, wherein one or more of the elemental processing resources of the computational type is an execution-instruction processing cache.

10. The method of claim 1, further comprising routing the execution instruction through an execution-instruction signal router having arbitration logic that will enable the execution-instruction signal router to arbitrate requests from the elemental processing resources of the first type for access to one of the shared computational type elemental processing resources.

11. The method of claim 1, wherein an execution-instruction signal causes various elemental processing resources dynamically to turn on and off to maintain a desired level of power draw while maximizing processing throughput.

12. The method of claim 1, further comprising generating an execution-instruction signal from at least one of the elemental processing resources, wherein the execution-instruction signal from the elemental processing resources themselves shuts off processing resources while idling.

13. The method of claim 1, further comprising generating an execution-instruction signal from at least one of the elemental processing resources, wherein an execution-instruction signal from processing resources themselves turn on processing resources when execution-instruction signal processing is required.

14. The method of claim 1, wherein the elemental processing resources are communicatively disposed on a same die.

15. The method of claim 14, wherein an execution-instruction signal router is on the same die with elemental processing resources.

16. A method of execution-instruction delegation among multiple interdependent elemental processing resources, the processing resources comprising at least two Instruction Processing Units (IPUs) and two or more computational processing resources comprising, in any combination, one or more of MPUs, instruction delegating caches, encryption or decryption logic, digital signal processors, graphics processors, or vector processors, the multiple elemental processing resources being configured to perform processing operations according instructions in an instruction set but being individually incapable of servicing at least one instruction in the instruction set, the elemental processing resources being configured such that a first and a second of the IPUs each share at least two of the computational processing resources in common the method comprising:

receiving, from memory, one of multiple execution-instructions of a thread at a first Instruction Processing Unit (IPU) of the at least two IPUs;

processing the first execution-instruction using a first of the IPUs;

receiving another execution-instruction of the thread at the first IPU;

determining that the other execution-instruction from the thread can not be processed by the first IPU and must be executed by a computational processing resource;

receiving a request by the first IPU for access to one of the shared-in-common computational processing resources that can execute the other execution instruction;

receiving an acknowledgement that allows delegation by the first IPU to the one of the shared-in-common computational processing resources;

delegating the other execution-instruction from the thread to a pipeline for the one of the two or more shared-in-common computational processing resources along with an identifier of the first IPU so that it can process the other execution instruction from the thread and return a first result of the execution to the first IPU based upon the identifier by broadcasting the identifier of the first IPU onto a bus shared by the first IPU and the two or more shared-in-common computational processing resources;

maintaining the thread in the first IPU in a sleep state until an indicator that the processing of the other execution-instruction from the thread by the computational processing resource is returned to the first IPU, via the shared bus, based upon the identifier;

receiving an execution instruction of a different thread at a second of the IPUs;

determining that the execution-instruction of the different thread can not be processed by the second IPU but can be processed by the one shared-in common computational processing resource that is shared between the second IPU and the first IPU;

arbitrating access to the one shared-in-common computational processing resource by the second IPU; and delegating the execution-instruction from the different thread to the one shared-in-common computational processing resource along with an identifier of the second IPU so that the one shared-in-common computational processing resource can execute the execution-instruction from the different thread and return a second result to the second IPU based upon the identifier of the second IPU by broadcasting the identifier of the second IPU onto a bus shared by the second IPU, the first IPU, and the two or more shared-in-common computational processing resources.

* * * * *